United States Patent
Sugiura et al.

(10) Patent No.: US 8,183,907 B2
(45) Date of Patent: May 22, 2012

(54) DETECTION CIRCUIT AND SENSOR DEVICE

(75) Inventors: Masakazu Sugiura, Chiba (JP); Atsushi Igarashi, Chiba (JP)

(73) Assignee: Seiko Instruments Inc., Chiba (JP)

(*) Notice: Subject to any disclaimer, the term of this patent is extended or adjusted under 35 U.S.C. 154(b) by 383 days.

(21) Appl. No.: 12/686,674

(22) Filed: Jan. 13, 2010

(65) Prior Publication Data

US 2010/0180059 A1     Jul. 15, 2010

(30) Foreign Application Priority Data

Jan. 13, 2009    (JP) ................. 2009-005213

(51) Int. Cl.
*H03K 17/00* (2006.01)
(52) U.S. Cl. ............... 327/365; 327/143; 710/262
(58) Field of Classification Search .......... 327/142, 327/143, 198, 365; 710/262
See application file for complete search history.

(56) References Cited

U.S. PATENT DOCUMENTS

| | | | |
|---|---|---|---|
| 4,902,910 A * | 2/1990 | Hsieh | 327/143 |
| 5,036,227 A * | 7/1991 | Jo et al. | 326/94 |
| 5,587,684 A * | 12/1996 | Salcedo | 327/538 |
| 6,163,183 A * | 12/2000 | Azimi et al. | 327/142 |
| 6,407,598 B1 * | 6/2002 | Ogane | 327/143 |
| 6,933,754 B2 * | 8/2005 | Restle | 327/77 |
| 7,148,742 B2 * | 12/2006 | Pan et al. | 327/539 |
| 2007/0103211 A1 * | 5/2007 | Hsieh | 327/143 |

FOREIGN PATENT DOCUMENTS

JP       08-279739 A    10/1996

* cited by examiner

*Primary Examiner* — Lincoln Donovan
*Assistant Examiner* — William Hernandez
(74) *Attorney, Agent, or Firm* — Brinks Hofer Gilson & Lione

(57) ABSTRACT

Provided is a detection circuit for monitoring a power supply voltage with a circuit configuration in which power consumption is reduced, and a sensor device including the detection circuit. A detection circuit (100) detects an input signal input thereto to output an output signal. An interrupt condition generating circuit (10a) directly detects a power supply voltage (VDD) supplied thereto from a power supply, and outputs an interrupt signal until the power supply voltage makes a transition to a predetermined voltage range. An interrupt condition reception circuit outputs, as an output signal, a given voltage without allowing an input signal (Vtemp) to be output until an interrupt caused by the interrupt signal is released, and outputs, as an output signal, the input signal by allowing the input signal to be output when the interrupt caused by the interrupt signal is released.

14 Claims, 14 Drawing Sheets

DETECTION CIRCUIT AND SENSOR DEVICE

RELATED APPLICATIONS

This application claims priority under 35 U.S.C. §119 to Japanese Patent Application No. 2009-005213 filed on Jan. 13, 2009, the entire content of which is hereby incorporated by reference.

BACKGROUND OF THE INVENTION

1. Technical Field

The present invention relates to a detection circuit and a sensor device which are capable of ensuring a reliability of a signal to be output when power is turned on.

2. Description of the Related Art

For a detection circuit used in a sensor device or the like, an operation-enabled power supply voltage range, which is best suited to the circuit, is defined. In the operation-enabled power supply voltage range, the circuit is ensured proper operation, and therefore the reliability of a signal to be output from the circuit is secured.

When power is turned on, the power supply voltage transiently increases to an operation-enabled power supply voltage, and hence a state transition is effected in which the power supply voltage increases to reach the operation-enabled power supply voltage. In order to ensure the reliability of a signal to be output during the state transition, the detection circuit employs a measure of controlling and fixing the signal to be output (see, for example, JP 08-279739 A).

As such measure, there is a case of employing a measure involving providing a power supply voltage monitoring circuit, and monitoring a power supply voltage to be input, to thereby detect a low power supply voltage state. For example, in the power supply voltage detection circuit illustrated in FIG. 1 of JP 08-279739 A, when a power supply voltage being monitored becomes equal to or higher than a predetermined set value, an operation-enabled signal is supplied to an electronic circuit 20. With this configuration, the electronic circuit 20 may be prevented from causing malfunction.

Meanwhile, a sensor device for detecting a state is desired to operate with low power consumption. In particular, in a case where the sensor device is a temperature sensor for detecting temperatures of a target state, self heating of the sensor device may interfere with an accurate measurement.

However, the power supply voltage monitoring circuit disclosed in JP 08-279739 A includes a bleeder resistor, and hence there arises a problem in the power supply voltage monitoring circuit, which is a circuit for detecting a drop in power supply voltage, in that the bleeder resistor or the like provided in the power supply voltage monitoring circuit wastes power even if the power supply voltage falls within the operation-enabled power supply voltage range.

Further, in order to attain low power consumption with a circuit which is configured to include the bleeder resistor as described above, the impedance of the bleeder resistor needs to be increased. When the impedance of the bleeder resistor is increased, the chip area is also caused to be increased, resulting in an increase in cost.

SUMMARY OF THE INVENTION

The present invention has been made in order to solve the above-mentioned problems, and therefore it is an object of the invention to provide a detection circuit for monitoring a power supply voltage with a circuit configuration in which power consumption is reduced, and a sensor device including the detection circuit.

In order to solve the above-mentioned problem, the present invention provides a detection circuit for detecting an input signal input thereto to output an output signal, including: an interrupt condition generating circuit for directly detecting a power supply voltage supplied thereto, and outputting an interrupt signal until the power supply voltage makes a transition to a predetermined voltage range; and an interrupt condition reception circuit for outputting, as an output signal, a given voltage without allowing the input signal to be output until an interrupt caused by the interrupt signal is released, and outputting, as an output signal, the input signal by allowing the input signal to be output when the interrupt caused by the interrupt signal is released.

Further, in the above-mentioned detection circuit of the present invention, the interrupt condition generating circuit includes a judgment circuit for setting an offset potential to one of two signals input thereto, the offset potential being determined based on a potential difference determined in advance, outputting the interrupt signal when a potential difference between the two input signals falls short of the offset potential, and canceling the interrupt signal when the potential difference satisfies the offset potential.

Further, in the above-mentioned detection circuit of the present invention, the interrupt condition generating circuit outputs the interrupt signal until a predetermined time period elapses after power is turned on, and cancels the interrupt signal after a lapse of the predetermined time period.

Further, in the above-mentioned detection circuit of the present invention, a comparison is conducted based on a threshold potential determined in advance, to output the interrupt signal when the power supply voltage falls short of the threshold potential, and to cancel the interrupt signal when the power supply voltage satisfies the threshold potential.

Further, in the above-mentioned detection circuit of the present invention, the threshold voltage determined in advance includes a threshold voltage set by a semiconductor element which performs switching operation.

Further, in the above-mentioned detection circuit of the present invention, the interrupt condition generating circuit includes a retaining circuit for retaining a state of the interrupt signal.

Further, in the above-mentioned detection circuit of the present invention, the interrupt condition generating circuit outputs a reset instruction to reset the retaining circuit until the predetermined time period elapses after the power is turned on, cancels the reset instruction after the lapse of the predetermined time period, and cancels the interrupt signal by setting the retaining circuit when detecting that the power supply voltage has reached a given voltage determined in advance.

Further, in the above-mentioned detection circuit of the present invention, the interrupt condition generating circuit conducts the comparison based on the threshold potential determined in advance, outputs a reset instruction to reset the retaining circuit when the power supply voltage falls short of the threshold potential, cancels the reset instruction when the power supply voltage satisfies the threshold potential, and cancels the interrupt signal by setting the retaining circuit when detecting that the power supply voltage has reached a given voltage determined in advance.

Further, in the above-mentioned detection circuit of the present invention, the interrupt condition reception circuit outputs a given logic signal in a case where an interrupt state is set, the interrupt state including a state where the given voltage is output as the output signal without allowing the input signal to be output until the interrupt caused by the interrupt signal is released, and selects a logic for a signal to be output according to the input signal in a case where a released state is set, the released state including a state where the interrupt state is released.

Further, in the above-mentioned detection circuit of the present invention, the interrupt condition reception circuit outputs a given potential signal in a case where an interrupt state is set, the interrupt state including a state where the given voltage is output as the output signal without allowing the input signal to be output until the interrupt caused by the interrupt signal is released, and selects a potential for a signal to be output according to the input signal in a case where a released state is set, the released state including a state where the interrupt state is released.

Further, according to the present invention, the above-mentioned detection circuit further includes a comparator for detecting the input signal. In the detection circuit, the interrupt condition reception circuit inputs an output signal from the comparator, and generates, according to the interrupt signal, an output signal to be output.

Further, according to the present invention, the above-mentioned detection circuit further includes a comparator for detecting the input signal. In the detection circuit, the interrupt condition reception circuit generates, according to the interrupt signal, an output signal to be output, and inputs the output signal to the comparator.

The present invention also provides a sensor device including: the above-mentioned detection circuit; and a detection section for outputting information corresponding to detected physical quantities.

Further, according to the present invention, in the above-mentioned sensor device, the detection section includes a temperature sensor for detecting temperatures.

According to the present invention, the detection circuit detects the input signal input thereto and outputs the output signal. The interrupt condition generating circuit directly detects the power supply voltage supplied thereto, and outputs the interrupt signal until the power supply voltage makes the transition to the predetermined voltage range. The interrupt condition reception circuit outputs the given voltage as the output signal without allowing the input signal to be output until the interrupt caused by the interrupt signal is released. When the interrupt caused by the interrupt signal is released, the interrupt condition reception circuit outputs, as the output signal, the input signal by allowing the input signal to be output.

With this configuration, in the detection circuit, the interrupt condition generating circuit directly detects the power supply voltage. The detection circuit is capable of detecting the power supply voltage without using a circuit for converting the power supply voltage. Further, power consumption necessary for voltage conversion may be reduced, and the circuit necessary for the conversion may be omitted. Specifically, the detection circuit outputs the given voltage determined in advance by an interrupt condition reception circuit, as an output signal output immediately after power-on, until an interrupt condition generating circuit detects that the power supply voltage has made the transition to the predetermined voltage range and cancels the interrupt signal, and the input signal is allowed to be output only after the interrupt signal is canceled. This way secures the reliability of the output signal, because a signal which may exhibit an unsteady state is prevented from being output from the detection circuit immediately after the power-on.

DETAILED DESCRIPTION OF THE PREFERRED EMBODIMENTS

In the following, detection circuits according to embodiments of the present invention are described with reference to the accompanying drawings.

First Embodiment

Figure 1:
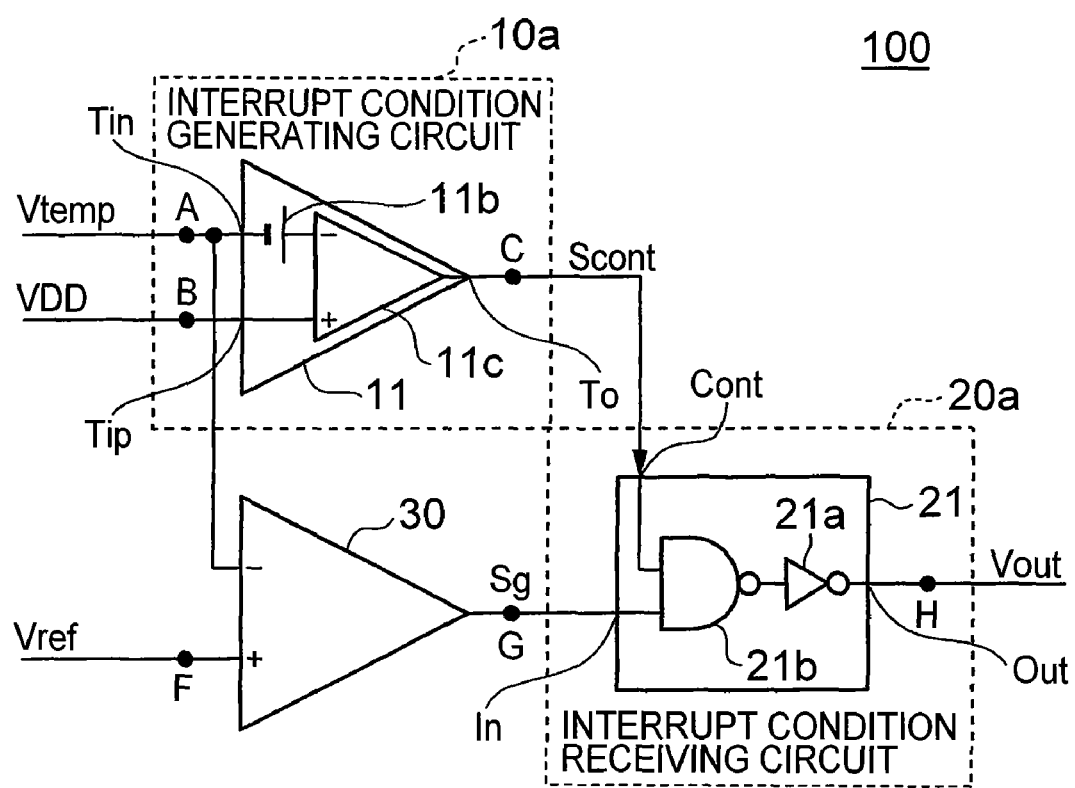
FIG. 1 is a schematic configuration diagram illustrating a detection circuit according to a first embodiment of the present invention.

FIG. 1 is a schematic configuration diagram illustrating a detection circuit 100 according to a first embodiment of the present invention.

The detection circuit 100 includes an interrupt condition generating circuit 10$a$, an interrupt condition reception circuit 20$a$, and a comparator 30. The interrupt condition generating circuit 10$a$ in the detection circuit 100 includes two input terminals Tip and Tin and an output terminal To. The interrupt condition generating circuit 10$a$ compares potentials of two input signals, detects whether the potential difference is equal to or larger than a predetermined value, and outputs the detection result as a binarized logic signal.

An offset comparator 11 is illustrated as an embodiment of the interrupt condition generating circuit 10a. The offset comparator 11 includes a bias voltage source 11b and a comparator 11c. The bias voltage source 11b generates a predetermined bias potential Vb, and sets a voltage offset, which corresponds to the amount of the generated bias potential Vb, to an input signal. The comparator 11c detects a potential difference between two input signals.

In the offset comparator 11, the input terminal Tin is connected to an inverting input terminal of the comparator 11c via the bias voltage source 11b, the input terminal Tip is connected to a non-inverting input terminal of the comparator 11c, and an output terminal of the comparator 11c is connected to the output terminal To.

A signal input to the input terminal Tin is converted by the bias voltage source 11b so as to have a potential increased by the bias potential Vb, and input to the comparator 11c.

With this configuration, the offset comparator 11 compares a voltage of a signal input to the input terminal Tip, with a threshold voltage which is obtained by increasing the voltage of a signal input to the input terminal Tin by a predetermined voltage (bias potential Vb). When a transition from a low state to a high state is effected on a potential of the signal input to the input terminal Tip as compared with a voltage obtained by adding the bias potential Vb to a potential of the signal input to the input terminal Tin, an output signal is inverted. The output signal exhibits a low level in the former state (state where the potential is lower than the voltage obtained by adding the bias potential Vb to the potential of the input signal to the input terminal Tin).

The interrupt condition generating circuit 10a outputs a signal which is the same as the signal output from the offset comparator 11.

The interrupt condition reception circuit 20a includes a signal input terminal In, a control input terminal Cont, and an output terminal Out. An output setting circuit 21 is illustrated as an embodiment of the interrupt condition reception circuit 20a. The output setting circuit 21 includes an inverter (inverting circuit) 21a and a NAND (inverted AND) gate 21b. The output setting circuit 21 has the signal input terminal In connected to one of input terminals of the NAND gate 21b, the control input terminal Cont connected to the other one of the input terminals of the NAND gate 21b, and the output terminal of the NAND gate 21b connected to the output terminal Out via the inverter 21a. With this configuration, in a case where a control signal Scont input to the control input terminal Cont is at a low level, an output signal Vout is set at a low level, whereas in a case where the control signal Scont is at a high level, a signal exhibiting the same logic as that of an input signal Sg is output as the output signal Vout. In other words, the interrupt condition reception circuit 20a outputs, as the output signal Vout, a predetermined voltage exhibiting a low level, without allowing the input signal Sg to be output, until the interrupt caused by the interrupt signal input as the control signal is released. Alternatively, when the interrupt caused by the interrupt signal is released, the interrupt condition reception circuit 20a allows the input signal Sg to be output, and outputs the input signal Sg as the output signal Vout.

The comparator 30 detects a potential difference between two input signals, and outputs a result of judgment made based on the detected potential difference, as a binarized logic signal.

Next, a connection example of the detection circuit 100 forming the sensor circuit is described. The detection circuit 100 receives an input of a power supply voltage VDD for actuating the detection circuit 100, an input signal Vtemp from the sensor circuit (not shown), and an input of a reference voltage Vref output from a reference power source RF (not shown). The sensor circuit (not shown) and the reference power source RF (not shown) each have a constant current source connected to a power supply terminal connected to a power source, and are each connected to a ground voltage VSS via an impedance element which serves as a load in the constant current source. The sensor circuit and the reference power source RF each have an output voltage output from a connection point between the constant current source and the impedance element. Accordingly, in a state where the power supply voltage VDD is low, the output voltages are equal to the power supply voltages due to the operation of the current source.

The interrupt condition generating circuit 10a has the input terminal Tip connected to a power source from which the power supply voltage VDD is input, and the input terminal Tin connected to an output terminal of the sensor circuit (not shown).

The comparator 30 has a non-inverting input terminal connected to the reference power source RF (not shown) which outputs the reference voltage Vref, and an inverting input terminal connected to the output terminal of the sensor circuit (not shown).

The interrupt condition reception circuit 20a has the input terminal In connected to an output terminal of the comparator 30, the control input terminal Cont connected to the output terminal To of the interrupt condition generating circuit 10a, and the output terminal Out connected to an output terminal of the detection circuit 100.

In the detection circuit 100 configured as described above, the control signal Scont output from the interrupt condition generating circuit 10a exhibits a low level in a case where the power supply voltage VDD is lower than a potential obtained by adding the bias potential Vb to the voltage of the input signal Vtemp. Meanwhile, the control signal Scont output from the interrupt condition generating circuit 10a exhibits a high level in a case where the power supply voltage VDD is higher than a potential obtained by adding the bias potential Vb to the voltage of the input signal Vtemp.

The output signal Sg of the comparator 30 exhibits a high level in a case where the voltage of the input signal Vtemp is lower than the reference voltage Vref. Meanwhile, the output signal Sg exhibits a low level in a case where the voltage of the input signal Vtemp is higher than the reference voltage Vref.

In the case where the control signal Scont exhibits a low level, the interrupt condition reception circuit 20a fixedly outputs the output signal Vout at a low level, whereas in the case where the control signal Scont exhibits a high level, the interrupt condition reception circuit 20a outputs the output signal Sg from the comparator 30 as the output signal Vout, the output signal Sg being changed according to the input signal Vtemp.

Figure 2:
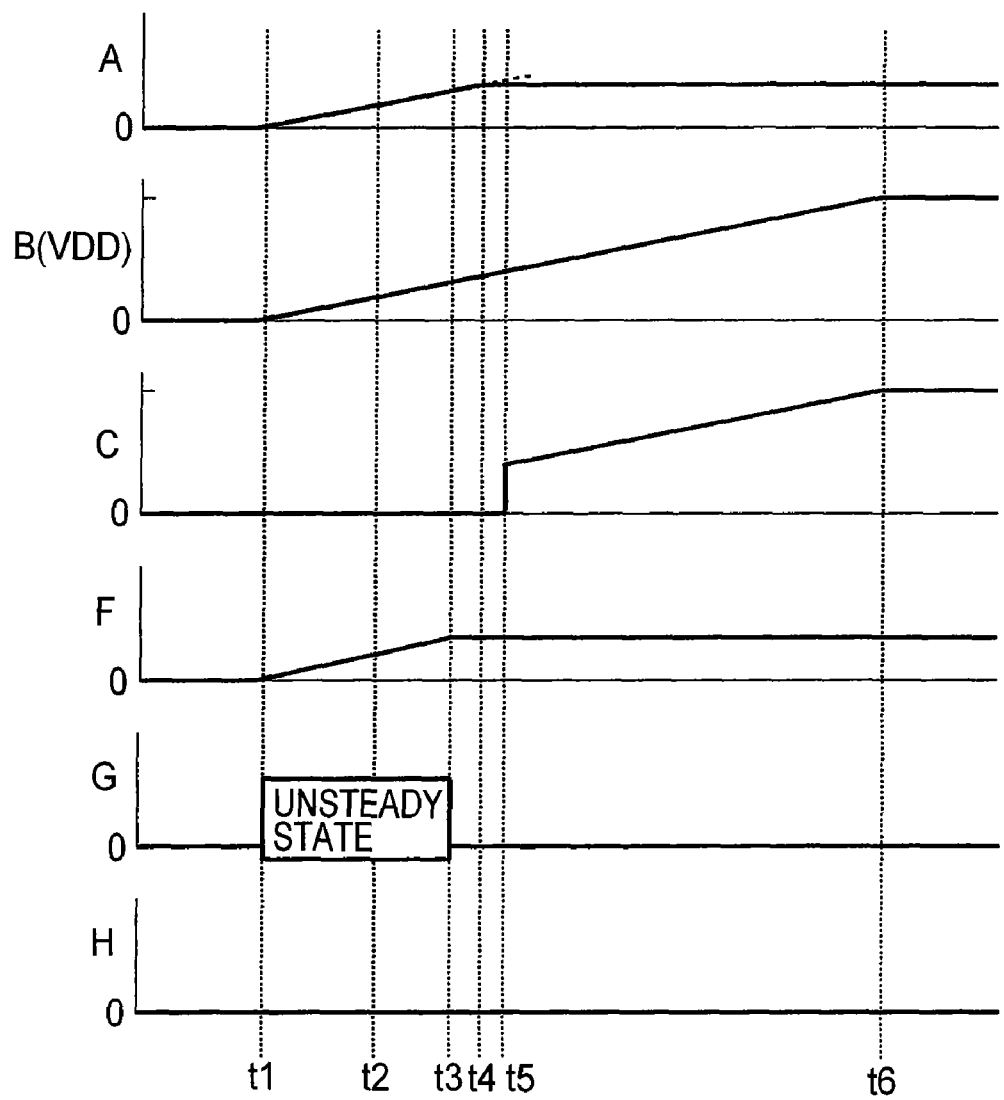
FIG. 2 is a timing chart for illustrating an operation of the detection circuit according to the first embodiment.

FIG. 2 is an example of a timing chart for illustrating an operation of the detection circuit 100 according to the first embodiment. With reference to points A, B, C, F, G, and H illustrated in the block diagram of FIG. 1, a signal transition at each of those points is described.

A waveform at the point A shows a voltage transition of the input signal Vtemp which is input from the sensor circuit and is subjected to the detection processing in the detection circuit 100. A waveform at the point B shows a voltage transition of the power supply voltage VDD supplied to the detection circuit 100. The power supply voltage VDD corresponds to the power supply voltage supplied to the detection circuit 100, the reference power source RF (not shown in FIG. 1), and the sensor circuit (not shown in FIG. 1). A waveform at the point C shows a voltage transition of the control signal Scont which has been subjected to the judgment made by the offset comparator 11 in the interrupt condition generating circuit 10a and output from the interrupt condition generating circuit 10a. The interrupt condition reception circuit 20a is controlled based on the control signal Scont. A waveform at the point F shows a voltage transition of the reference voltage Vref output from the reference power source RF. A waveform at the point G shows a voltage transition of the output signal Sg output as a result of the judgment made by the comparator 30. The output signal Sg corresponds to an input signal to the interrupt condition reception circuit 20a. A waveform at the point H shows a voltage transition of the output signal Vout output from the interrupt condition reception circuit 20a. In the range illustrated in the timing chart, there is occurring no event to be detected by the sensor circuit, and hence the output signal Vout constantly exhibits a low level.

In the initial state illustrated in FIG. 1, the power has not been turned on and no electric charge is accumulated in each of the circuits, and hence the signals each exhibit a non-signal state.

At a time t1, the detection circuit 100, and the sensor circuit and the reference power source RF, which are connected to the detection circuit 100, are turned on.

After that, the power supply voltage VDD gradually increases. The input signal Vtemp and the reference voltage Vref output respectively from the sensor circuit and the reference power source RF, which are supplied with power from the same power source, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The interrupt condition generating circuit 10a makes a judgment on input signals by comparing one of the signals with another, the one of the signals being applied with an offset potential. Accordingly, even when the potential difference between the input signals is small, a result of the judgment is output based on the comparison using the potential thus offset, without leading to an unsteady state where a signal of high level and a signal of low level are alternately output in a flip-flop manner. As a result, the control signal Scont exhibits a low level.

In the detection circuit 100, an unnecessary detection signal may be output as the output signal Sg from the comparator 30 in a transitional state after power-on until the operation-enabled power supply voltage is supplied. In other words, the power supply voltage VDD is insufficient for proper operation of an input signal judgment circuit provided to the comparator 30, and hence the state of the output signal Sg becomes unsteady and may not be identified.

On the other hand, the interrupt condition reception circuit 20a outputs a predetermined voltage as the output signal Vout without allowing the input signal to be output, until the power supply voltage reaches the predetermined voltage. The predetermined voltage output as the output signal Vout is defined as a voltage which exhibits a non-detection state (released state) in the sensor circuit, and is controlled according to the control signal Scont. The control signal Scont is output at a low level, and hence the output signal Vout is securely retained at a low level, with the result that a signal which exhibits an unnecessary detection state is not output.

At a time t2, the power supply voltage VDD increases, and the circuits each make a transition to an operation-enabled state.

In the interrupt condition generating circuit 10a, the input signal Vtemp increases along with the increase in power supply voltage VDD, and hence the potential difference therebetween is small. One of the signals has an offset voltage applied thereto, and hence the control signal Scont to be output is settled to a low level. The input signal Vtemp and the reference voltage Vref output from the sensor circuit and the reference power source RF, respectively, also gradually increase along with the increase in power supply voltage VDD, and hence the potential difference therebetween is small. The output signal Sg, which is obtained based on a comparison conducted between two signals with a small potential difference, continues to be in an unsteady state where the signal state may not be identified. In the interrupt condition reception circuit 20a, the control signal Scont is settled to a low level, and hence the output signal Vout is securely retained at a low level, with the result that a signal which exhibits an unnecessary detection state is not output.

At a time t3, the reference voltage Vref input from the reference power source RF reaches a predetermined voltage and is subjected to constant voltage control, which allows a constant voltage to be input. The power supply voltage VDD and the input signal Vtemp from the sensor circuit continue to increase in potential.

The reference voltage Vref exhibits a predetermined voltage while the reference voltage Vref exhibits a potential smaller than that of the input signal Vtemp, and hence the output signal Sg makes a transition from the unsteady state where the state is inconstant to a state capable of outputting a proper judgment result. Further, the output signal Vout remains to be under control of the control signal Scont and hence is securely retained at a low level, with the result that a signal which exhibits an unnecessary detection state is not output.

At a time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops. Then, the power supply voltage VDD has increased to be higher in voltage value than the input signal Vtemp which is determined based on a current supplied by a constant current circuit provided to the sensor circuit and the impedance of the sensor circuit, and a change based on the input signal Vtemp from the sensor circuit may be detected.

At a time t5, the interrupt condition generating circuit 10a detects a predetermined potential difference occurring between the input signal Vtemp from the sensor circuit and the power supply voltage VDD, that is, a potential difference equal to or larger than the offset potential in the interrupt condition generating circuit 10a. The result of the detection indicates that the power supply voltage VDD has made a transition to a state where an operation-enabled power supply voltage may be supplied to the sensor circuit. In the interrupt condition generating circuit 10a, the interrupt state (low level) set to the control signal Scont is released, and hence the control signal Scont increases in voltage along with a potential increase of the power supply voltage VDD.

At a time t6, the power supply voltage VDD reaches a predetermined operation-enabled power supply voltage and stops increasing further, and hence the power supply voltage VDD starts to exhibit a constant value. Further, the voltage of the control signal Scont stops increasing, and makes a transition to a state where a constant value is exhibited.

As described above, each of the signals makes a state transition when power is turned on. The output signal Vout is securely retained at a low level until the power supply voltage VDD reaches a predetermined operation-enabled power supply voltage, with the result that a signal which exhibits an unnecessary detection state may not be output.

Second Embodiment

With reference to the accompanying drawings, another embodiment of the detection circuit which is different in configuration is described.

Figure 3:
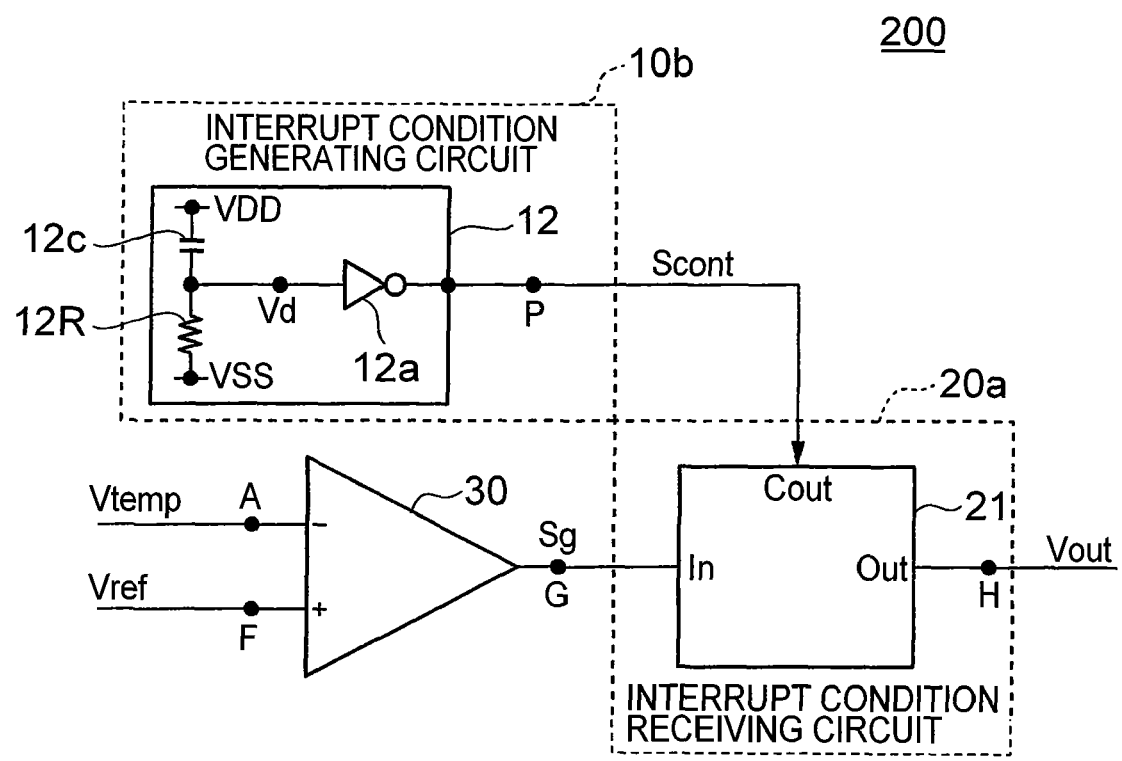
FIG. 3 is a schematic configuration diagram illustrating a detection circuit according to a second embodiment of the present invention.

FIG. 3 is a schematic configuration diagram illustrating a detection circuit 200 according to a second embodiment of the present invention.

The detection circuit 200 includes an interrupt condition generating circuit 10b, the interrupt condition reception circuit 20a, and the comparator 30. Constituent elements similar to those of FIG. 1 are denoted by the same reference numerals and symbols, and a description is given of constituent elements different from those of FIG. 1.

The interrupt condition generating circuit 10b of the detection circuit 200 outputs a signal which retains an initial state for a predetermined period time when power is turned on. The interrupt condition generating circuit 10b includes a power on clear (POC) circuit 12. The POC circuit 12 is a so-called power-on initialization circuit.

The POC circuit 12 includes a capacitor 12c and a resistor 12R connected in series. One terminal of the capacitor 12c is connected to a power source (power supply voltage VDD), and one terminal of the resistor 12R is connected to a reference power source (ground voltage VSS). A connection point between the capacitor 12c and the resistor 12R is connected to an input terminal of an inverter (NOT circuit) 12a, and the inverter 12a outputs the control signal Scont of the interrupt condition generating circuit 10b. The output terminal of the interrupt condition generating circuit 10b is connected to the control input terminal Cont of the interrupt condition reception circuit 20a.

In the detection circuit 200 configured as described above, the control signal Scont output from the interrupt condition generating circuit 10b exhibits a low level until a predetermined time period elapses after power is turned on, and exhibits a high level after a lapse of the predetermined time period.

The output signal Sg from the comparator 30 exhibits a high level when the voltage of the input signal Vtemp is lower than the reference voltage Vref. Meanwhile, the output signal Sg from the comparator 30 exhibits a low level when the voltage of the input signal Vtemp is higher than the reference voltage Vref.

In the case where the control signal Scont exhibits a low level, the interrupt condition reception circuit 20a fixedly outputs the output signal Vout at a low level, whereas in the case where the control signal Scont exhibits a high level, the interrupt condition reception circuit 20a outputs the output signal Sg from the comparator 30 as the output signal Vout, the output signal Sg being changed according to the input signal Vtemp.

Figure 4:
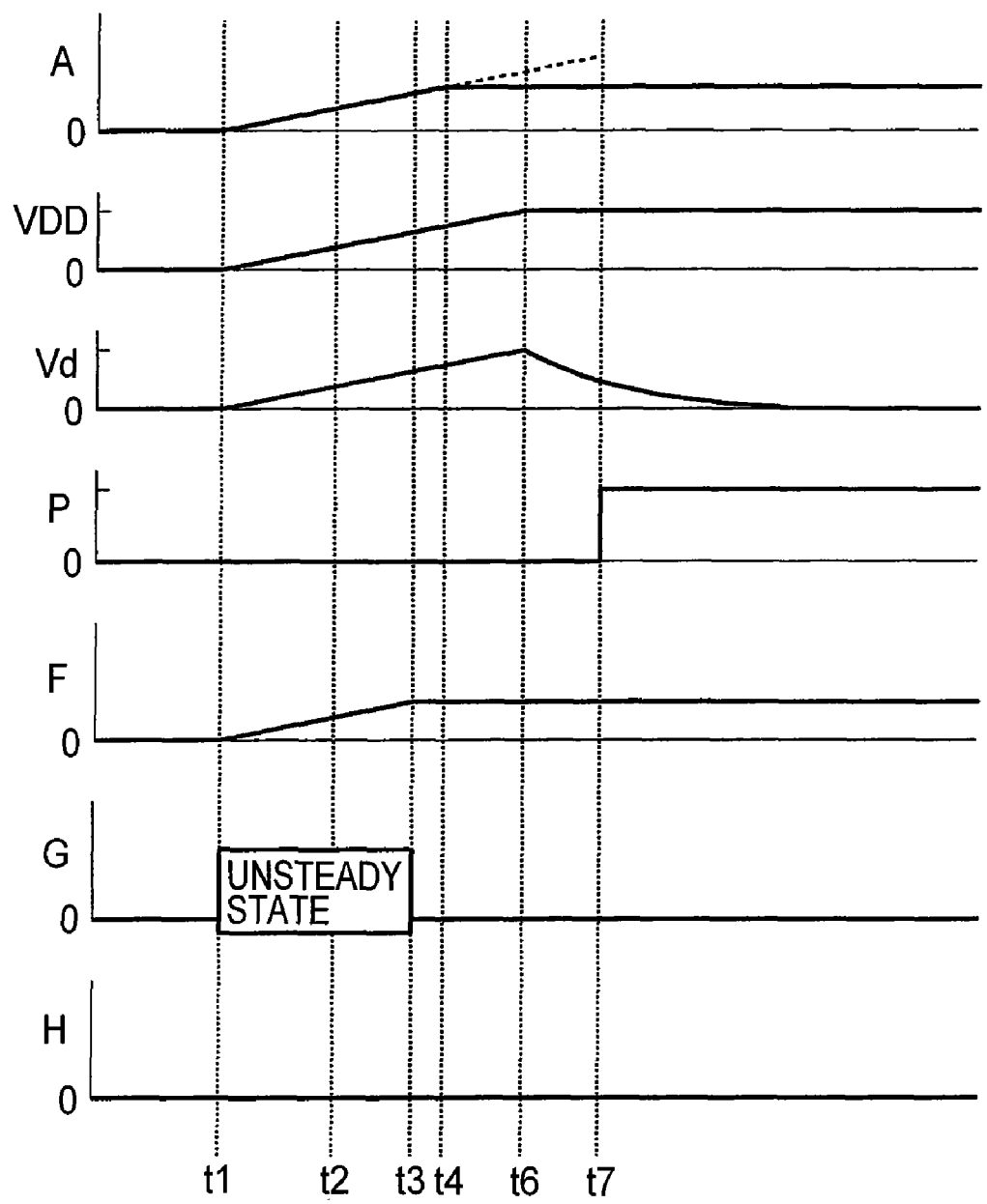
FIG. 4 is a timing chart for illustrating an operation of the detection circuit according to the second embodiment.

FIG. 4 is a timing chart for illustrating an operation of the detection circuit 200 according to the second embodiment.

With reference to points A, F, G, H, P, Vd, and VDD illustrated in the block diagram of FIG. 3, a signal transition at each of those points is described. The signals and times similar to those of FIG. 2 are denoted by the same reference symbols, and signals and times different from those of FIG. 2 are mainly described. The detection circuit 100 illustrated in FIG. 2 should be interpreted as the detection circuit 200.

A waveform at the point VDD shows a voltage transition of the power supply voltage VDD in the POC circuit 12. A waveform at the point Vd shows a voltage transition at a junction point Vd in a CR circuit of the POC circuit 12. A waveform at the point P shows a voltage transition of the control signal Scont which is output by the POC circuit 12 after being subjected to the judgment made by the POC circuit 12 in the interrupt condition generating circuit 10b. The interrupt condition reception circuit 20a is controlled based on the control signal Scont.

In the initial state illustrated in FIG. 4, the power has not been turned on and no electric charge is accumulated in each of the circuits, and hence the signals each exhibit a non-signal state.

At the time t1, the detection circuit 200, and the sensor circuit and the reference power source RF, which are connected to the detection circuit 200, are turned on. After that, the power supply voltage VDD gradually increases. The input signal Vtemp and the reference voltage Vref output from the sensor circuit and the reference power source RF, respectively, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The POC circuit 12 in the interrupt condition generating circuit 10b detects the power supply voltage VDD.

The capacitor 12c and the resistor 12R form a time constant circuit. Due to the time constant circuit, a potential at the point Vd changes according to a transient characteristic with a first order lag which is identified as a step response based on the power supply voltage VDD as an input. A potential at the point Vd increases following the power-on, but the control signal Scont still exhibits a low level because the inverter 12a has not been actuated.

The detection circuit 200 is in a transient state after power-on until the operation-enabled power supply voltage is supplied, and the state of the output signal Sg from the comparator 30 is unsteady and may not be identified.

On the other hand, the interrupt condition reception circuit 20a outputs a predetermined voltage as the output signal Vout without allowing the input signal to be output, until the power supply voltage VDD reaches the predetermined voltage. The predetermined voltage output as the output signal Vout is defined as a voltage which exhibits a non-detection state (released state) in the sensor circuit, and is controlled according to the control signal Scont. The control signal Scont is output at a low level, and hence the output signal Vout is securely retained at a low level, with the result that a signal which exhibits an unnecessary detection state is not output.

At the time t2, the power supply voltage VDD increases, and the circuits each make a transition to an operation-enabled state.

In the POC circuit 12 of the interrupt condition generating circuit 10b, a potential at the point Vd is higher than a threshold potential in the inverter 12a. As the power supply voltage VDD to the inverter 12a transiently increases, the threshold potential of the inverter 12a increases along with the increase in power supply voltage VDD. Accordingly, the control signal Scont is settled to a low level. The input signal Vtemp and the reference voltage Vref output from the sensor circuit and the reference power source RF, respectively, also gradually increase along with the increase in power supply voltage VDD, and hence the potential difference therebetween is small. The output signal Sg, which is obtained based on a comparison conducted between two signals with a small potential difference, continues to be in an unsteady state where the signal state may not be identified. In the interrupt condition reception circuit 20a, the control signal Scont is settled to a low level, and hence the output signal Vout is securely retained at a low level, with the result that a signal which exhibits an unnecessary detection state is not output.

At the time t3, the reference voltage Vref input from the reference power source RF reaches a predetermined voltage and is subjected to constant voltage control, which allows a constant voltage to be input. The power supply voltage VDD and a potential of the input signal Vtemp from the sensor circuit continue to increase.

The reference voltage Vref exhibits a predetermined voltage while the reference voltage Vref exhibits a potential smaller than that of the input signal Vtemp, and hence the output signal Sg makes a transition from the unsteady state where the state is inconstant to a state capable of outputting a proper judgment result. Further, the output signal Vout remains to be under control of the control signal Scont and hence is securely retained at a low level, with the result that a signal which exhibits an unnecessary detection state is not output.

At the time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops. Then, the power supply voltage VDD has increased to be higher in voltage value than the input signal Vtemp which is determined based on a current supplied by a constant current circuit provided to the sensor circuit and the impedance of the sensor circuit, and a change based on the input signal Vtemp from the sensor circuit may be detected.

At the time t6, the power supply voltage VDD reaches a predetermined operation-enabled power supply voltage and stops increasing further, and hence the power supply voltage VDD starts to exhibit a constant value. Further, the potential of the control signal Scont stops increasing, and makes a transition to a state where a constant value is exhibited.

In the POC circuit 12 of the interrupt condition generating circuit 10b, the power supply voltage VDD has made a state transition to be subjected to constant voltage control, and hence a potential increase at the point Vd stops and starts to decline.

At, a time t7, in the POC circuit 12 of the interrupt condition generating circuit 10b, when a potential at the point Vd is reduced to be lower than the threshold voltage of the inverter 12a, the control signal Scont makes a transition to a high level. The interrupt condition generating circuit 10b releases the interrupt state (low level) set to the control signal that has been output as the control signal Scont. As a result, the detection circuit 200 makes a transition to a normal state capable of outputting a detection signal.

As described above, each of the signals makes a state transition when power is turned on. The output signal Vout is securely retained at a low level until the power supply voltage VDD reaches a predetermined operation-enabled power supply voltage, with the result that a signal which exhibits an unnecessary detection state may not be output.

Third Embodiment

With reference to the accompanying drawings, another embodiment of the detection circuit which is different in configuration is described.

Figure 5:
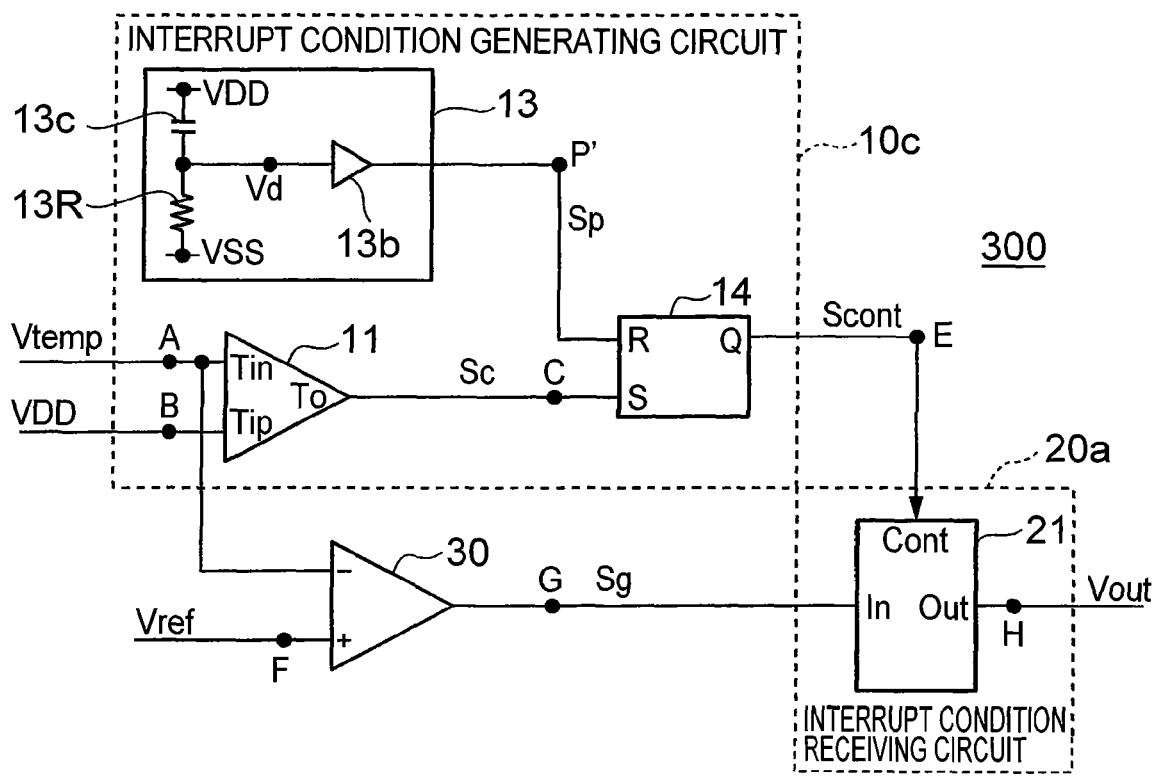
FIG. 5 is a schematic configuration diagram illustrating a detection circuit according to a third embodiment of the present invention.

FIG. 5 is a schematic configuration diagram illustrating a detection circuit 300 according to a third embodiment of the present invention.

The detection circuit 300 includes an interrupt condition generating circuit 10c, the interrupt condition reception circuit 20a, and the comparator 30. Constituent elements similar to those of FIGS. 1 and 3 are denoted by the same reference numerals and symbols, and a description is given of constituent elements different from those of FIGS. 1 and 3.

In the detection circuit 300, the interrupt condition generating circuit 10c includes the offset comparator 11, a POC circuit 13, and a Reset Set (RS) flip-flop 14.

The POC circuit 13 includes a so-called power-on initialization circuit. The POC circuit 13 includes a capacitor 13c and a resistor 13R connected in series. One terminal of the capacitor 13c is connected to a positive terminal of a power source (power supply voltage VDD), and one terminal of the resistor 13R is connected to a negative terminal of the power source (ground voltage VSS). A connection point between the capacitor 13c and the resistor 13R is connected to an input terminal of a buffer 13b. When a voltage (voltage at the point Vd) input to the buffer 13b is equal to or larger than a threshold voltage (inverted voltage) of the buffer 13b, a signal Sp' output from the buffer 13b is set to a high level exhibited by the power supply voltage VDD, and when the voltage is less than the threshold value (inverted voltage), the signal Sp' is set to a low level exhibited by the reference voltage VSS. A signal output from the buffer 13b serves as an output signal from the POC circuit 13. When a voltage at the point Vd becomes equal to or larger than the inverted voltage of the buffer 13b, the signal Sp' corresponds to the power supply voltage VDD, and when the voltage becomes lower than the inverted voltage, the signal Sp' corresponds to the reference voltage VSS. The threshold voltage of the buffer 13b is half of the power supply voltage VDD.

The offset comparator 11 outputs a signal Sc. The signal Sc corresponds to the control signal Scont of the first and second embodiments. The RS flip-flop 14 includes an RS-type flip-flop.

The offset comparator 11 has an output terminal thereof connected to a set input terminal (S) of the RS flip-flop 14, the POC circuit 13 has an output terminal thereof connected to a reset input terminal (R) of the RS flip-flop 14, and the RS flip-flop 14 outputs a signal, from an output terminal thereof, as the control signal Scont of the interrupt condition generating circuit 10c. When a high level is input to the set input terminal (S), an output signal from the RS flip-flop 14 is set to a high level (set). When a high level is input to the reset input terminal (R), the output signal is set to a low level (reset). When a high level is input to both of the terminals, the reset request is prioritized, and the output signal is set to a low level (reset).

In the detection circuit 300 configured as described above, the control signal Scont output from the interrupt condition generating circuit 10c exhibits a low level in a case where the power supply voltage VDD is lower than a potential obtained by adding the bias potential Vb to the voltage of the input signal Vtemp. Meanwhile, the control signal Scont exhibits a high level in a case where the power supply voltage VDD is higher than a potential obtained by adding the bias potential Vb to the voltage of the input signal Vtemp.

The control signal Scont output from the interrupt condition generating circuit 10c exhibits a high level until a predetermined time period elapses after power is turned on, and exhibits a low level after a lapse of the predetermined time period.

The output signal Sg from the comparator 30 exhibits a high level when the voltage of the input signal Vtemp is lower than the reference voltage Vref. Meanwhile, the output signal Sg from the comparator 30 exhibits a low level when the voltage of the input signal Vtemp is higher than the reference voltage Vref.

In the case where the control signal Scont exhibits a low level, the interrupt condition reception circuit 20a fixedly outputs the output signal Vout at a low level, whereas in the case where the control signal Scont exhibits a high level, the interrupt condition reception circuit 20a outputs the output signal Sg from the comparator 30 as the output signal Vout, the output signal Sg being changed according to the input signal Vtemp.

Figure 6:
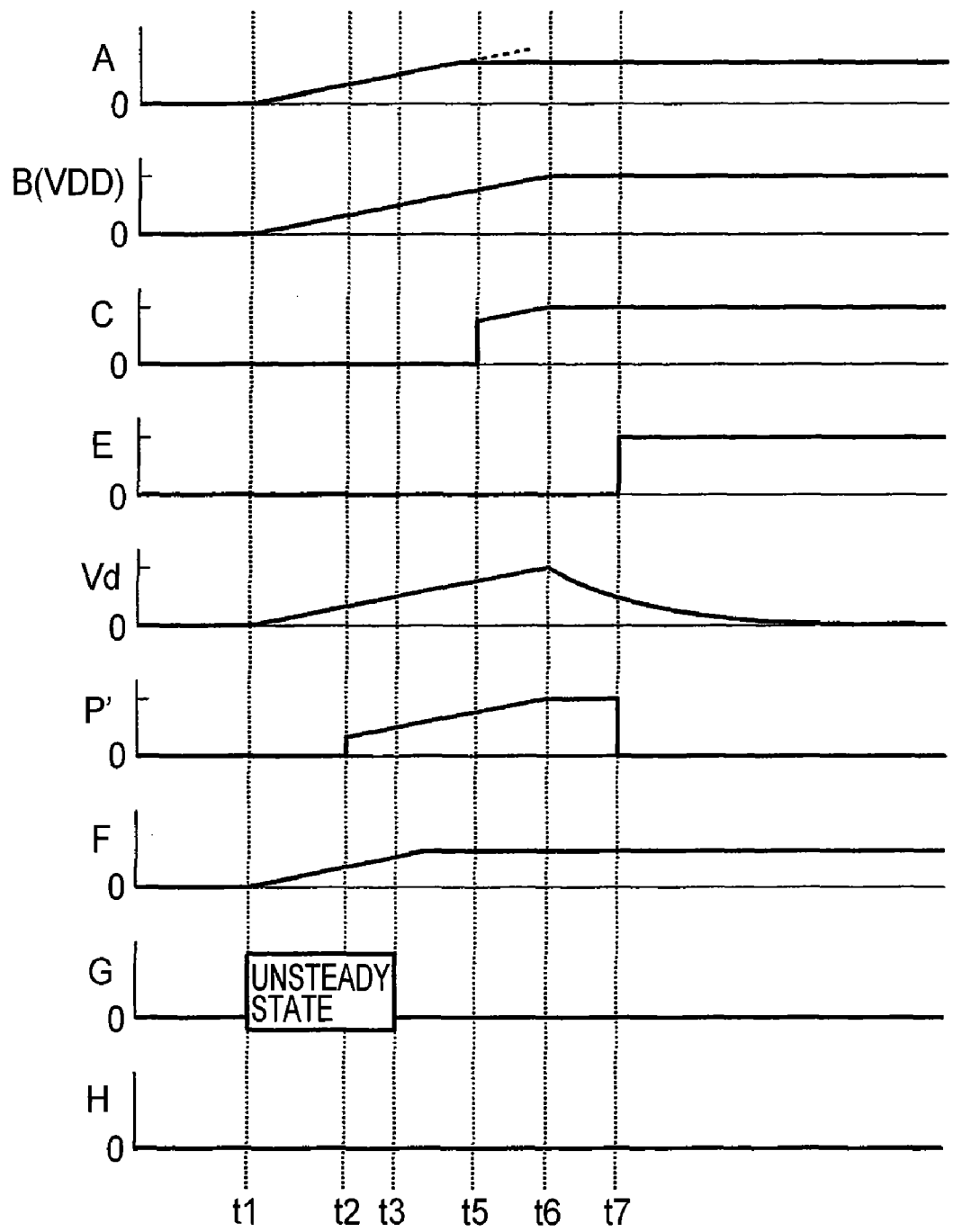
FIG. 6 is a timing chart for illustrating an operation of the detection circuit according to the third embodiment.

FIG. 6 is a timing chart for illustrating an operation of the detection circuit 300 according to the third embodiment.

With reference to points A, B (VDD), C, E, F, G, H, P', and Vd illustrated in the block diagram of FIG. 5, a signal transition at each of those points is described. The signals and times similar to those of FIGS. 2 and 4 are denoted by the same reference symbols, and signals and times different from those of FIGS. 2 and 4 are mainly described. The detection circuit 100 illustrated in FIG. 2 and the detection circuit 200 illustrated in FIG. 4 should be interpreted as the detection circuit 300.

A waveform at the point C shows a voltage transition of the signal Sc output from the offset comparator 11 of the interrupt condition generating circuit 10c. A waveform at the point E shows the control signal Scont output from the RS flip-flop 14 of the interrupt condition generating circuit 10c. A waveform at the point P' shows a voltage transition of the signal Sp' output from the POC circuit 13 of the interrupt condition generating circuit 10c.

In the initial state illustrated in FIG. 6, the power has not been turned on and no electric charge is accumulated in each of the circuits, and hence the signals each exhibit a non-signal state.

At the time t1, the detection circuit 300, and the sensor circuit and the reference power source RF, which are connected to the detection circuit 300, are turned on. After that, the power supply voltage VDD gradually increases. The input signal Vtemp and the reference voltage Vref output from the sensor circuit and the reference power source RF, respectively, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The detection circuit 300 is in a transient state after power-on until the operation-enabled power supply voltage is supplied, and the state of the output signal Sg from the comparator 30 is unsteady and may not be identified.

In the interrupt condition generating circuit 10c, the offset comparator 11 makes a judgment on input signals by comparing one of the signals with another, the one of the signals being applied with an offset potential. Accordingly, even when the potential difference between the input signals is small, a result of the judgment is output based on the comparison using the potential thus offset, without leading to an unsteady state. As a result, the signal Sc exhibits a low level.

The POC circuit 13 detects the power supply voltage VDD. A potential at the point Vd increases following the power-on, but the signal Sp' still exhibits a low level because the buffer 13b has not been actuated. The RS flip-flop 14 receives an input of low level at the set input terminal (S) and an input of low level at the reset input terminal (R), but has not been actuated, and therefore the control signal Scont still exhibits a low level, retaining the initial state.

On the other hand, the interrupt condition reception circuit 20a outputs a predetermined voltage as the output signal Vout without allowing the input signal to be output, until the power supply voltage reaches the predetermined voltage. The predetermined voltage output as the output signal Vout is defined as a voltage which exhibits a non-detection state (released state) in the sensor circuit, and is controlled according to the control signal Scont. The control signal Scont is output at a low level, and hence the output signal Vout is securely retained at a low level, with the result that a signal which exhibits an unnecessary detection state is not output.

At the time t2, the power supply voltage VDD increases, and the circuits each make a transition to an operation-enabled state.

In the offset comparator 11 of the interrupt condition generating circuit 10c, despite a small potential difference between the input signal Vtemp and the power supply voltage VDD, the signal Sc is settled to a low level because one of the signals is applied with an offset potential. In the POC circuit 13, a voltage of a signal at the point Vd is higher than the threshold potential of the buffer 13b. As the power supply voltage VDD to the buffer 13b transiently increases, the threshold potential of the buffer 13b increases along with the increase in power supply voltage VDD. As a result, the signal Sp' is output at a high level. In the RS flip-flop 14, the set input terminal (S) receives an input of low level and the reset input terminal (R) receives an input of high level, with the result that a signal of low level is output as the control signal Scont from an output terminal (Q).

The input signal Vtemp and the reference voltage Vref output from the sensor circuit and the reference power source RF, respectively, also gradually increase, along with the increase in power supply voltage VDD, and hence the potential difference therebetween is small. The output signal Sg, which is obtained based on a comparison conducted between two signals with a small potential difference, continues to be in an unsteady state where the signal state may not be identified.

In the interrupt condition reception circuit 20a, the control signal Scont is settled to a low level, and hence the output signal Vout is securely retained at a low level, with the result that a signal which exhibits an unnecessary detection state is not output.

At the time t3, the input from the reference power source RF represented by the reference voltage Vref reaches a predetermined voltage and then is subjected to constant voltage control, which allows a constant voltage to be input. The power supply voltage VDD and a potential of the input signal Vtemp from the sensor circuit continue to increase.

The reference voltage Vref exhibits a predetermined voltage while the reference voltage Vref exhibits a potential smaller than that of the input signal Vtemp, and hence the output signal Sg makes a transition from the unsteady state where the state is inconstant to a state capable of outputting a proper judgment result. Further, the output signal Vout remains to be under control of the control signal Scont and hence is securely retained at a low level, with the result that a signal which exhibits an unnecessary detection state is not output.

At the time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops. Then, the power supply voltage VDD has increased to be higher in voltage value than the input signal Vtemp which is determined based on a current supplied by a constant current circuit provided to the sensor circuit and the impedance of the sensor circuit, and a change based on the input signal Vtemp from the sensor circuit may be detected.

At the time t5, the offset comparator 11 of the interrupt condition generating circuit 10c detects a predetermined potential difference occurring between the input signal Vtemp from the sensor circuit and the power supply voltage VDD, that is, a potential difference equal to or larger than the offset potential in the interrupt condition generating circuit 10c. The result of the detection indicates that the power supply voltage VDD has made a transition to a state where an operation-enabled power supply voltage may be supplied to the sensor circuit.

The offset comparator 11 outputs the signal Sc at a high level, and the potential of the signal Sc increases along with the potential increase of the power supply voltage VDD. In the RS flip-flop 14, the set input terminal (S) receives an input of high level and the reset input terminal (R) receives an input of high level, with the result that a signal at a low level is output from an output terminal (Q). Further, the output signal Vout remains to be under control of the control signal Scont and hence is securely retained at a low level, with the result that a signal which exhibits an unnecessary detection state is not output.

At the time t6, the power supply voltage VDD reaches a predetermined operation-enabled power supply voltage and stops increasing further, and hence the power supply voltage VDD starts to exhibit a constant value. Further, the signal Sc and other signals stop increasing, and make a transition to a state where a constant value is exhibited. In the POC circuit 13 of the interrupt condition generating circuit 10c, a potential of a signal at the point Vd drops. A signal at the point Vd is judged by the buffer 13b, with a voltage which is half the power supply voltage VDD being set as the threshold voltage, and the signal Sp' is output at a high level.

In the RS flip-flop 14 of the interrupt condition generating circuit 10c, the state of input signals remains unchanged, and the set input terminal (S) receives an input of high level and the reset input terminal (R) receives an input of high level, with the result that the output terminal (Q) still outputs a signal at a low level. The interrupt condition generating circuit 10c continues to output the control signal Scont at a low level, to thereby sustain the interrupt state (low level). Further, the output signal Vout remains to be under control of the control signal Scont and hence is securely retained at a low level, with the result that a signal which exhibits an unnecessary detection state is not output.

At the time t7, in the POC circuit 13 of the interrupt condition generating circuit 10c, when a potential of a signal at the point Vd is reduced to be lower than the threshold voltage of the buffer 13b (voltage which is half the power supply voltage VDD), the signal Sp' makes a transition to a low level.

In the RS flip-flop 14, the set input terminal (S) receives an input of high level and the reset input terminal (R) receives an input of low level, with the result that the output terminal (Q) outputs a signal at a high level, to thereby output the control signal Scont.

The interrupt condition generating circuit 10c sets the control signal Scont to the interrupt-released state (high level). As a result, the detection circuit 300 makes a transition to a normal state capable of outputting a detection signal, and switches to a state where the output signal Sg may be output so as to serve as an input to the interrupt condition reception circuit 20a. The output signal Sg is at a low level, and hence the output signal Vout is securely retained at a low level, with the result that a signal which exhibits an unnecessary detection state is not output.

As described above, each of the signals makes a state transition when power is turned on. The output signal Vout is securely retained at a low level until the power supply voltage VDD reaches a predetermined operation-enabled power supply voltage, with the result that a signal which exhibits an unnecessary detection state may not be output.

Fourth Embodiment

With reference to the accompanying drawings, another embodiment of the detection circuit which is different in configuration is described.

Figure 7:
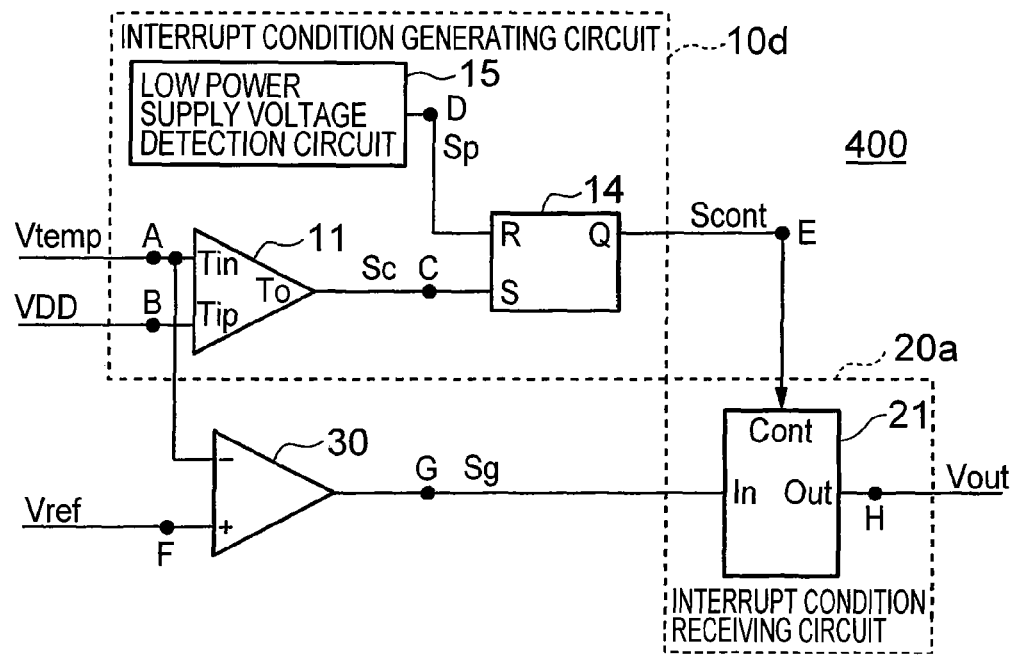
FIG. 7 is a schematic configuration diagram illustrating a detection circuit according to a fourth embodiment of the present invention.

FIG. 7 is a schematic configuration diagram illustrating a detection circuit 400 according to a fourth embodiment of the present invention.

The detection circuit 400 includes an interrupt condition generating circuit 10d, the interrupt condition reception circuit 20a, and the comparator 30. Constituent elements similar to those of FIGS. 1 and 5 are denoted by the same reference numerals and symbols, and a description is given of constituent elements different from those of FIGS. 1 and 5.

In the detection circuit 400, the interrupt condition generating circuit 10d includes the offset comparator 11, the RS flip-flop 14, and a low power supply voltage detection circuit 15.

The low power supply voltage detection circuit 15 detects a drop in the power supply voltage.

Figure 8:
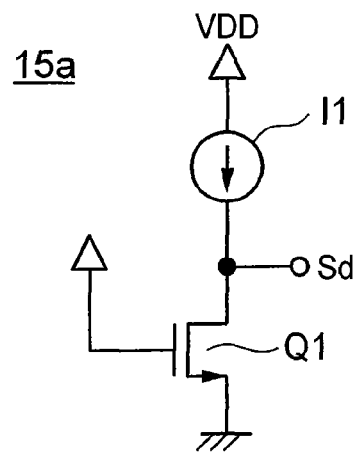
FIG. 8 is a schematic configuration diagram illustrating a low power supply voltage detection circuit according to the fourth embodiment.

FIG. 8 is a schematic configuration diagram illustrating an example of the low power supply voltage detection circuit 15.

The low power supply voltage detection circuit 15 illustrated in FIG. 8 includes a transistor Q1 and a constant current source I1.

The transistor Q1 includes an n-channel metal oxide semiconductor field effect transistor (NMOSFET). The transistor Q1 has a gate thereof connected to a positive terminal of a power source (power supply voltage VDD), a source thereof connected to a negative terminal of the power source (ground voltage VSS), and a drain thereof connected to one terminal of the constant current source I1 that has another terminal thereof connected to the positive terminal of the power source. That is, the transistor Q1 forms a common source amplifier circuit with the constant current source I1 as a load.

Figure 9A:
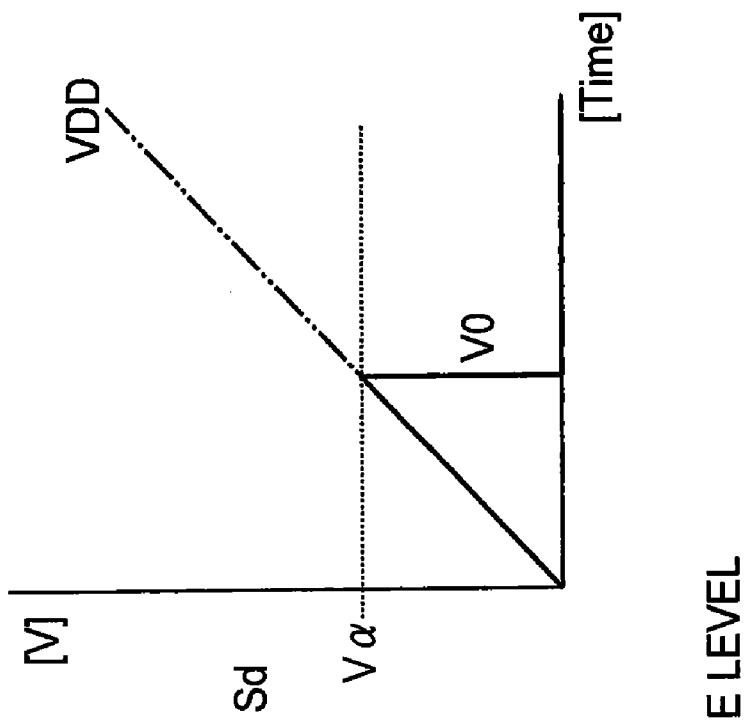
FIGS. 9A and 9B are graphs for illustrating an operation of the low power supply voltage detection circuit according to the fourth embodiment.
Figure 9B:
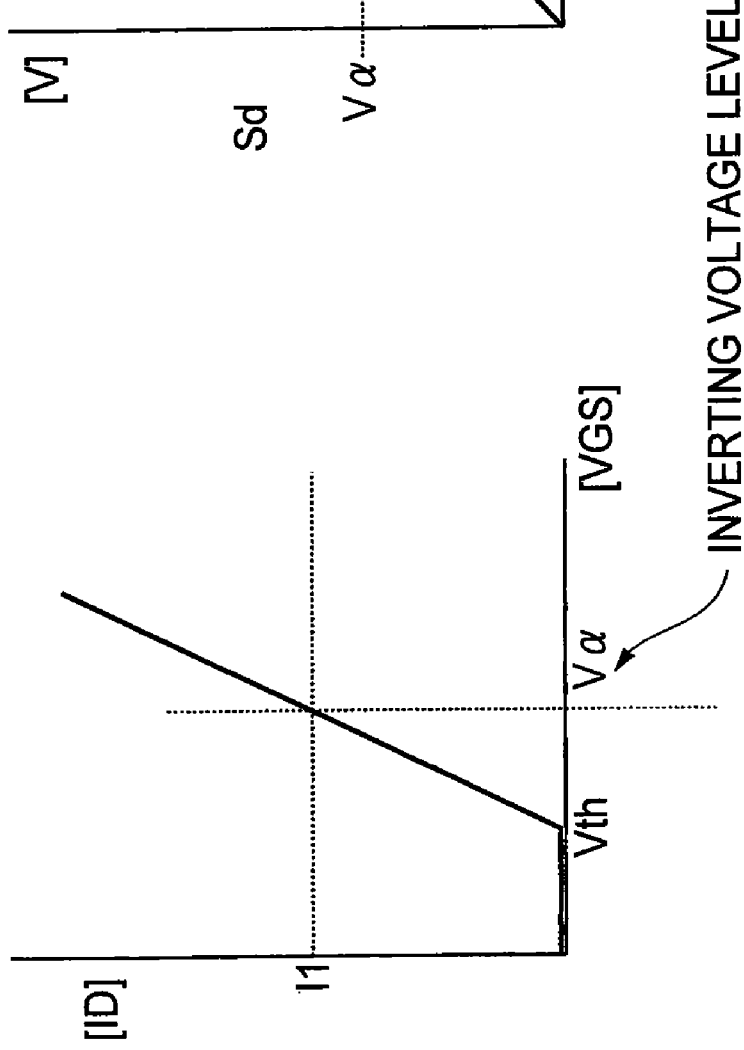

FIGS. 9A and 9B are graphs for illustrating an operation of the low power supply voltage detection circuit 15 illustrated in FIG. 8.

FIG. 9A is a graph illustrating an amplification characteristic of the transistor Q1, in which a gate-source voltage (VGS) in the transistor Q1 is plotted along the abscissa thereof and a drain current (ID) is plotted along the ordinate thereof. An intercept Vth on the abscissa of the graph represents a threshold voltage of the gate-source voltage VGS in the transistor Q1. As illustrated in the graph, in a state where the gate-source voltage VGS in the transistor Q1 is lower than a predetermined voltage Vα, the transistor Q1 does not reach saturation and a constant current i1 set to the constant current source I1 is not allowed to flow therethrough. On the other hand, in a state where the gate-source voltage VGS has exceeded a predetermined voltage Vα, the transistor Q1 becomes saturated.

FIG. 9B is a timing chart illustrating a change in signal Sd, which occurs through the application of the power supply voltage VDD, which gradually increases due to the characteristic exhibited by the circuit configuration described above. The voltage of the signal Sd makes a transition along with the change of the power supply voltage VDD until the voltage VDD reaches the voltage Vα. When the power supply voltage VDD reaches the voltage Vα, the signal Sd makes a transition to a state where the signal exhibits a low level.

Referring again to FIG. 7, a connection state of the interrupt condition generating circuit 10d is described.

The offset comparator 11 has an output terminal thereof connected to the set input terminal (S) of the RS flip-flop 14, the low power supply voltage detection circuit 15 has an output terminal thereof connected to the reset input terminal (R) of the RS flip-flop 14, and the RS flip-flop 14 outputs, from an output terminal thereof, an output signal of the interrupt condition generating circuit 10d.

Figure 10:
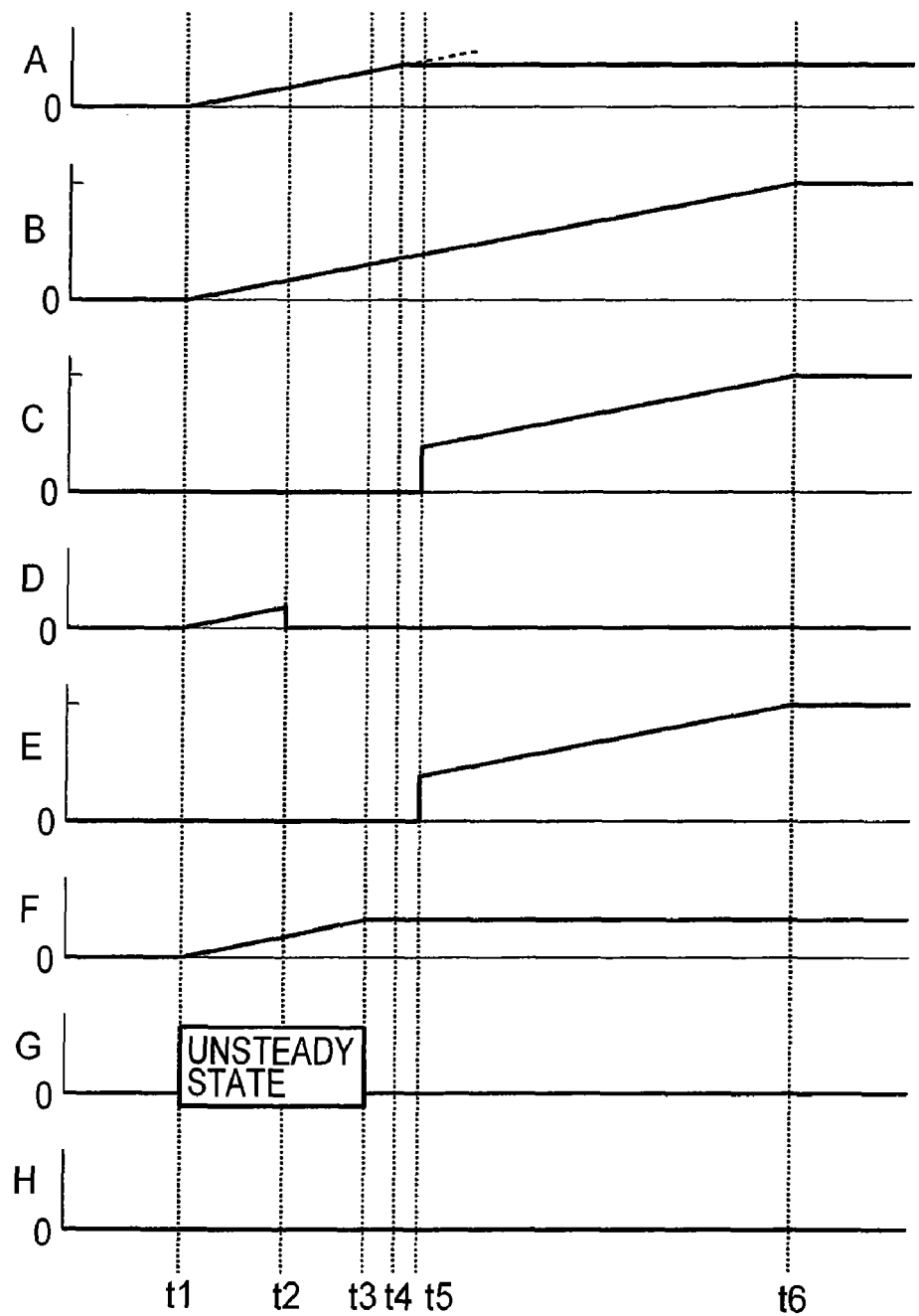
FIG. 10 is a timing chart for illustrating an operation of the detection circuit according to the fourth embodiment.

FIG. 10 is a timing chart for illustrating an operation of the detection circuit 400 according to the fourth embodiment.

With reference to points A to H illustrated in the block diagram of FIG. 7, a signal transition at each of those points is described. The signals and times similar to those of FIGS. 2, 4, and 6 are denoted by the same reference symbols, and signals and times different from those of FIGS. 2, 4, and 6 are mainly described. The detection circuit 100 illustrated in FIG. 2, the detection circuit 200 illustrated in FIG. 4, and the detection circuit 300 illustrated in FIG. 6 are interpreted as the detection circuit 400.

A waveform at the point D shows the signal Sd output from the low power supply voltage detection circuit 15.

In the initial state illustrated in FIG. 10, the power has not been turned on and no electric charge is accumulated in each of the circuits. Hence, the signals each exhibit a non-signal state.

At the time t1, the detection circuit 400, and the sensor circuit and the reference power source RF, which are connected to the detection circuit 400, are powered on. After that, the power supply voltage VDD gradually increases. The input signal Vtemp and the reference voltage Vref output from the sensor circuit and the reference power source RF, respectively, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The detection circuit 400 is in a transient state after power-on until the operation-enabled power supply voltage is supplied, and the state of the output signal Sg from the comparator 30 is unsteady and may not be identified.

In the interrupt condition generating circuit 10d, the offset comparator 11 makes a judgment on input signals by comparing one of the signals with another, the one of the signals being applied with an offset potential. Accordingly, even when the potential difference between the input signals is small, a result of the judgment is output based on the comparison using the potential thus offset, without leading to an unsteady state. As a result, the signal Sc exhibits a low level.

In the low power supply voltage detection circuit 15, the power supply voltage is lower than a threshold potential in semiconductor elements (such as the transistors Q1 and Q2) which form the circuit, and the signal Sd increases in voltage along with the increase in power supply voltage. In the RS flip-flop 14, the set input terminal (S) receives an input of low level, and the reset input terminal (R) receives an input of low level. The RS flip-flop 14 is not actuated yet and hence the control signal Scont is output at a low level with the initial state maintained.

On the other hand, the interrupt condition reception circuit 20a outputs a predetermined voltage as the output signal Vout without allowing the input signal to be output, until the power supply voltage reaches the predetermined voltage. The predetermined voltage output as the output signal Vout is defined as a voltage which exhibits a non-detection state (released state) in the sensor circuit, and is controlled according to the control signal Scont. As the control signal Scont, the signal at a low level is output, and hence the output signal Vout is securely retained at a low level, with the result that a signal which exhibits an unnecessary detection state is not output.

At the time t2, the power supply voltage VDD increases, and the circuits each make a transition to an operation-enabled state.

In the offset comparator 11 of the interrupt condition generating circuit 10d, despite a small potential difference between the input signal Vtemp and the power supply voltage VDD, the signal Sc is settled to a low level because one of the signals is applied with an offset potential. In the low power supply voltage detection circuit 15, the power supply voltage is higher than the threshold potential in the semiconductor elements (such as the transistors Q1 and Q2) which form the circuit, and the signal Sd is output at a low level because the power supply voltage has exceeded a predetermined threshold voltage. In the RS flip-flop 14, the set input terminal (S) receives an input of low level, and the reset input terminal (R) receives an input of low level. The RS flip-flop 14 is actuated and hence the control signal Scont is output at a low level according to a state of an input signal.

The input signal Vtemp and the reference voltage Vref output from the sensor circuit and the reference power source RF, respectively, also gradually increase along with the increase in power supply voltage VDD, and hence the potential difference therebetween is small. The output signal Sg, which is obtained based on a comparison conducted between two signals with a small potential difference, continues to be in an unsteady state where the signal state may not be identified.

In the interrupt condition reception circuit 20a, the control signal Scont is settled to a low level, and hence the output signal Vout is securely retained at a low level, with the result that a signal which exhibits an unnecessary detection state is not output.

At the time t3, the input from the reference power source RF represented by the reference voltage Vref reaches a predetermined voltage and then is subjected to constant voltage control, which allows a constant voltage to be input. The power supply voltage VDD and a potential of the input signal Vtemp from the sensor circuit continue to increase.

The reference voltage Vref exhibits a predetermined voltage while the reference voltage Vref exhibits a potential smaller than that of the input signal Vtemp, and hence the output signal Sg makes a transition from the unsteady state where the state is inconstant to a state capable of outputting a proper judgment result. Further, the output signal Vout remains to be under control of the control signal Scont and hence is securely retained at a low level, with the result that a signal which exhibits an unnecessary detection state is not output.

At the time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops. Then, the power supply voltage VDD has increased to be higher in voltage value than the input signal Vtemp which is determined based on a current supplied by a constant current circuit provided to the sensor circuit and the impedance of the sensor circuit, and a change based on the input signal Vtemp from the sensor circuit may be detected.

At the time t5, the offset comparator 11 of the interrupt condition generating circuit 10d detects a predetermined potential difference occurring between the input signal Vtemp from the sensor circuit and the power supply voltage VDD, that is, a potential difference equal to or larger than the offset potential in the interrupt condition generating circuit 10d. The result of the detection indicates that the power supply voltage VDD has made a transition to a state where an operation-enabled power supply voltage may be supplied to the sensor circuit.

The offset comparator 11 outputs the signal Sc at a high level, which increases along with the potential increase of the power supply voltage VDD. In the RS flip-flop 14, the set input terminal (S) receives an input of high level while the reset input terminal (R) receives an input of low level, with the result that the output is inverted so that the signal at a high level is output. The interrupt condition generating circuit 10d releases the interrupt state (low level) set to the control signal Scont. As a result, the detection circuit 400 makes a transition to a normal state capable of outputting a detection signal.

At the time t6, the power supply voltage VDD reaches a predetermined operation-enabled power supply voltage and stops increasing further, and hence the power supply voltage VDD starts to exhibit a constant value. Further, the increase in voltage of the signal Sc and other signals along with the increase in power supply voltage is stopped, and the signals make a transition to a state where a constant value is exhibited.

As described above, each of the signals makes a state transition when power is turned on. The output signal Vout is securely retained at a low level until the power supply voltage VDD reaches a predetermined operation-enabled power supply voltage, with the result that a signal which exhibits an unnecessary detection state may not be output.

Fifth Embodiment

With reference to the accompanying drawings, another embodiment of the low power supply voltage detection circuit which is different in configuration is described.

Figure 11:
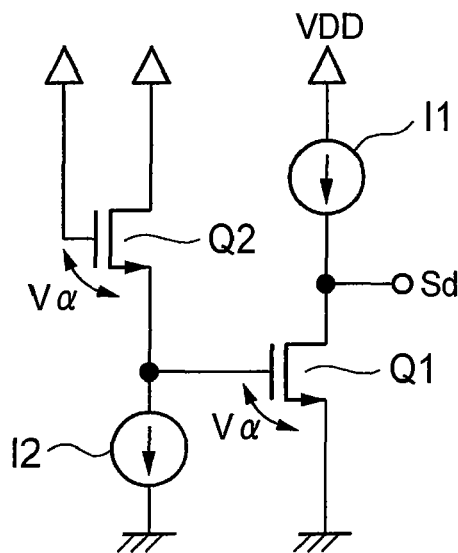
FIG. 11 is a schematic configuration diagram illustrating a low power supply voltage detection circuit according to a fifth embodiment.

FIG. 11 is a schematic configuration diagram illustrating a low power supply voltage detection circuit 15b according to a fifth embodiment of the present invention.

The low power supply voltage detection circuit 15b illustrated in FIG. 11 includes the transistors Q1 and Q2, and the constant current sources I1 and I2.

The transistors Q1 and Q2 each include an n-channel metal oxide semiconductor field effect transistor (NMOSFET). The transistor Q2 has a gate and a drain thereof connected to the positive terminal of a power source (power supply voltage VDD), and a source thereof connected to the constant current source I2 which is connected, at another terminal thereof, to the negative terminal of the power source (ground voltage VSS).

The transistor Q1 has a gate thereof connected to the source of the transistor Q2, a source thereof connected to the ground voltage VSS, and a drain thereof connected to the constant current source I1 which is connected, at another terminal thereof, to the positive terminal of the power source. That is, the transistors Q1 and Q2 form a multistage amplifier circuit, in which a common source amplifier circuit including the constant current source I1 as a load is used as an output stage.

Figure 12A:
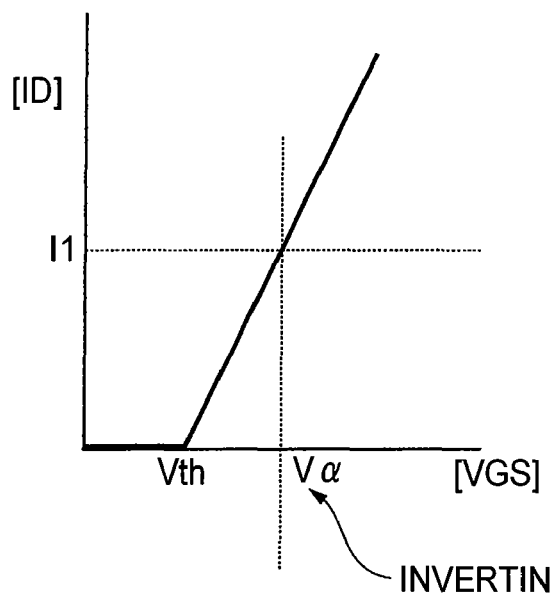
FIGS. 12A and 12B are graphs for illustrating an operation of the low power supply voltage detection circuit according to the fifth embodiment.
Figure 12B:
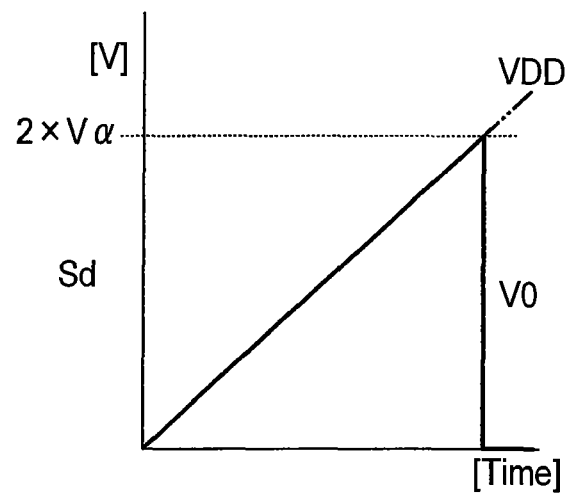

FIGS. 12A and 12B are graphs for illustrating an operation of the low power supply voltage detection circuit 15b according to the fifth embodiment.

FIG. 12A is a graph illustrating an amplification characteristic of the transistor Q1 (Q2), in which a gate-source voltage (VGS) in the transistor Q1 (Q2) is plotted along the abscissa thereof and a drain current (ID) is plotted along the ordinate thereof. An intercept Vth on the abscissa of the graph represents a threshold voltage of the gate-source voltage VGS in the transistor Q1 (Q2). As illustrated in the graph, in a state where the gate-source voltage VGS in the transistor Q1 (Q2) is lower than a predetermined voltage Vα, the transistor Q1 (Q2) becomes an off (shut-off) state in which a current set as the constant current source I1 is not allowed to flow therethrough. On the other hand, in a state where the gate-source voltage VGS has exceeded the predetermined voltage Vα, the transistor Q1 (Q2) becomes an on (conduction) state. It should be noted that the transistors Q1 and Q2 may be different from each other in characteristics.

FIG. 12B is a timing chart illustrating a change in signal Sd, which occurs through the application of the power supply voltage VDD, which gradually increases due to the characteristic exhibited by the circuit configuration described above.

A voltage of the signal Sd makes a transition along with a change in power supply voltage VDD until the power supply voltage VDD reaches a voltage (2×Vα). When the power supply voltage VDD reaches the voltage (2×Vα), the signal Sd makes a transition to a state where the signal exhibits a low level. The transistors Q1 and Q2 are connected in multistage configuration, and hence the threshold voltage for the low power supply detection voltage may be doubled as compared to the case where the transistor is provided in a single stage.

Sixth Embodiment

With reference to the accompanying drawings, another embodiment of the detection circuit which is different in configuration is described.

Figure 13:
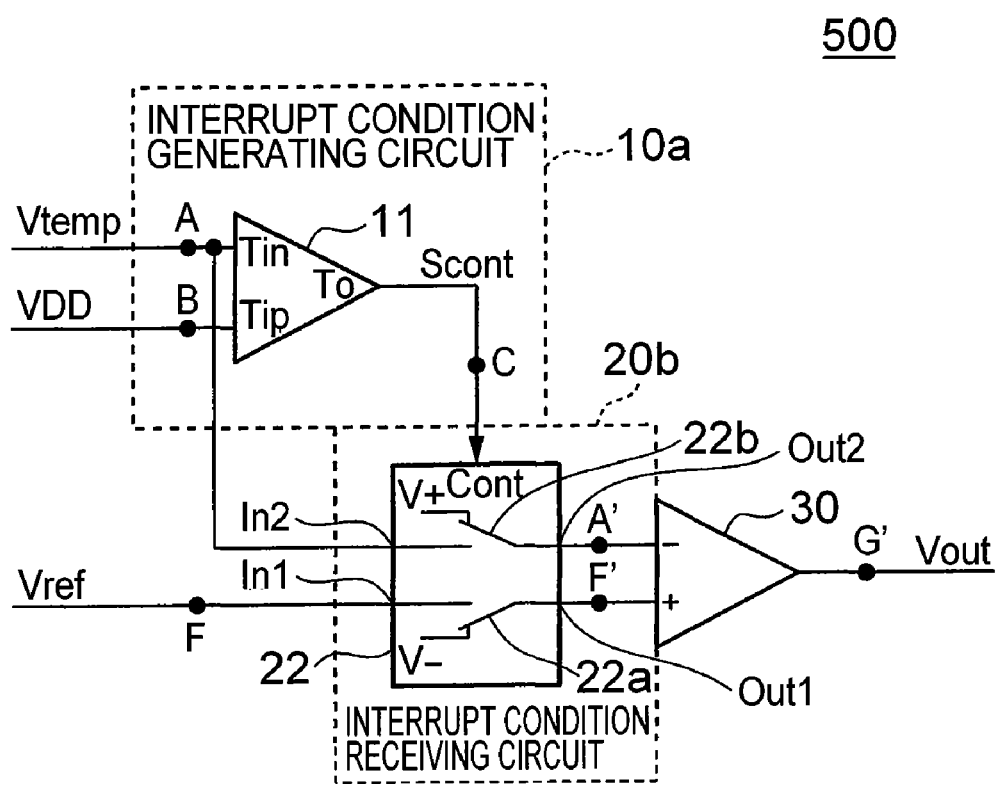
FIG. 13 is a schematic configuration diagram illustrating a detection circuit according to a sixth embodiment of the present invention.

FIG. 13 is a schematic configuration diagram illustrating a detection circuit 500 according to a sixth embodiment of the present invention.

The detection circuit 500 includes the interrupt condition generating circuit 10a, an interrupt condition reception circuit 20b, and the comparator 30. Constituent elements similar to those of FIG. 1 are denoted by the same reference numerals and symbols, and a description is given of constituent elements different from those of FIG. 1.

The interrupt condition reception circuit 20b of the detection circuit 500 includes a selection circuit 22.

The selection circuit 22 includes switches 22a and 22b, which operate in conjunction with a control signal to be input.

The switches 22a and 22b each are connected between each of output terminals Out1 and Out2 and each of input terminals In1 and In2, the output terminals Out1 and Out2 being provided in association with the input terminals In1 and In2. The switches 22a and 22b selectively switch between a predetermined voltage and an input signal input to the input terminals, according to an interrupt signal input to a control input terminal Cont as the control signal Scont, to thereby output one of the predetermined voltage and the input signal. The switches 22a and 22b output predetermined voltages, and the predetermined voltage (V−) output from the switch 22a is set to be lower than the predetermined voltage (V+) output from the switch 22b. In other words, the interrupt condition reception circuit 20b outputs predetermined voltages output via the switches 22a and 22b as output signals, without allowing an input signal to be output, until the interrupt caused by the interrupt signal input as the control signal is released. On the other hand, the interrupt condition reception circuit 20b allows the input signal to be output when the interrupt caused by the interrupt signal is released, and outputs the input signal as an output signal.

Next, a connection state of the detection circuit 500 is described.

The detection circuit 500 receives a power supply for actuating the detection circuit 500, an input of the input signal Vtemp from the sensor circuit (not shown), and an input of the reference voltage Vref output from the reference power source RF (not shown).

The interrupt condition generating circuit 10a has the input terminal Tip connected to the positive terminal of a power source, which is applied with the voltage VDD. Further, the input terminal Tin connects to an output terminal of the sensor circuit (not shown). The interrupt condition reception circuit 20b has the input terminal In1 connected to the reference power source RF (not shown) which outputs the reference voltage Vref, the input terminal In2 connected to the output terminal of the sensor circuit (not shown), and the control input terminal Cont connected to an output terminal of the interrupt condition generating circuit 10a. The comparator 30 has the non-inverting input terminal thereof connected to the output terminal Out1 of the interrupt condition reception circuit 20b, and the inverting input terminal thereof connected to the output terminal Out2 of the interrupt condition reception circuit 20b.

Figure 14:
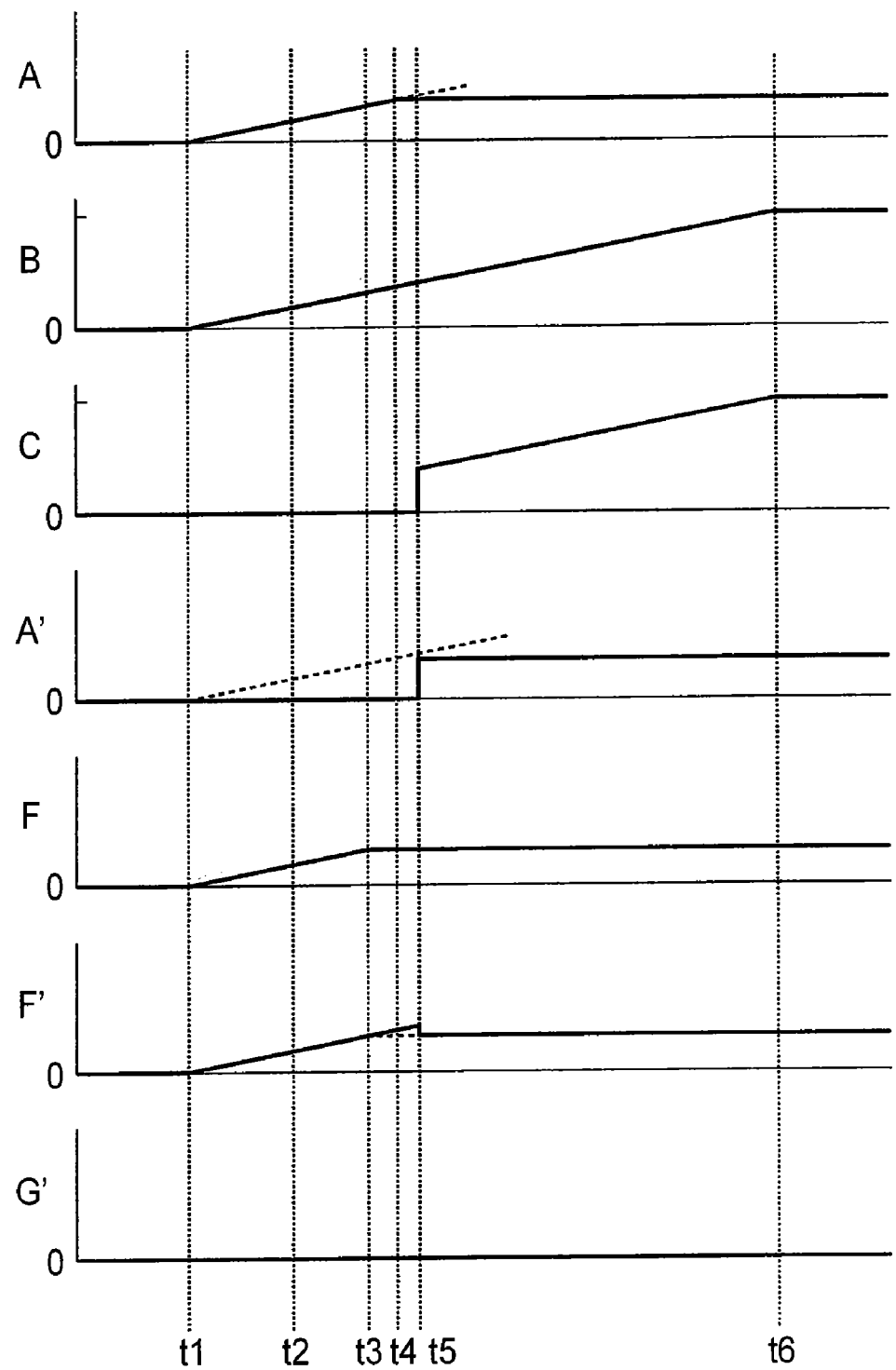
FIG. 14 is a timing chart for illustrating an operation of the detection circuit according to the sixth embodiment.

FIG. 14 is a timing chart for illustrating an operation of the detection circuit 500 according to the sixth embodiment.

With reference to points A, B, C, A', F, F', and G' illustrated in the block diagram of FIG. 13, a signal transition at each of those points is described. The signals and times similar to those of FIG. 2 are denoted by the same reference symbols, and signals and times different from those of FIG. 2 are mainly described. The detection circuit 100 illustrated in FIG. 2 is interpreted as the detection circuit 500.

A waveform at the point A' shows a voltage transition of a signal Sa' output at the point A' in the interrupt condition reception circuit 20b. The signal Sa' may be output as one of a signal the same as the input signal Vtemp input from the sensor circuit and a predetermined voltage set in advance.

A waveform at the point F' shows a voltage transition of a signal Sf' output at the point F' in the interrupt condition reception circuit 20b. The signal Sf' may be output as one of the reference voltage Vref output from the reference power source RF and to be supplied to the detection circuit 500 and a predetermined voltage set in advance.

A waveform at the point G' corresponds to the output signal Vout output from the detection circuit 500 after being subjected to the judgment made by the comparator 30. In the range illustrated in the timing chart, there is occurring no event to be detected by the sensor circuit, and hence the output signal Vout constantly exhibits a low level.

In the initial state illustrated in FIG. 14, the power has not been turned on and no electric charge is accumulated in each of the circuits. Hence, the signals each exhibit a non-signal state.

At the time t1, the detection circuit 500, and the sensor circuit and the reference power source RF, which are connected to the detection circuit 500, are powered on. After that, the power supply voltage VDD gradually increases. The input signal Vtemp and the reference voltage Vref output from the sensor circuit and the reference power source RF, respectively, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The interrupt condition generating circuit 10a makes a judgment on input signals by comparing one of the signals with another, the one of the signals being applied with an offset potential. Accordingly, in the interrupt condition generating circuit 10a, even when the potential difference between the input signals is small, a result of the judgment is output based on the comparison using the potential thus offset, without leading to an unsteady state. As a result, the control signal Scont exhibits a low level.

On the other hand, the comparator 30, which receives a signal input from the interrupt condition reception circuit 20b, performs a process of settling the output signal Vout so as to exhibit a non-detection state (released state) until the power supply voltage VDD reaches a predetermined voltage. The process of settling the signal so as to exhibit the released state is controlled by the control signal Scont. With the control signal Scont exhibiting a low level, the interrupt condition reception circuit 20b outputs predetermined voltages represented by the signals Sf' and Sa', from the output terminals Out1 and Out2, respectively. The interrupt condition reception circuit 20b outputs, as the signal Sf', the voltage (V−) close to the ground voltage VSS, and outputs, as the signal Sa', the voltage (V+) which increases along with the increase in power supply voltage VDD.

In this manner, the output signal Vout of the comparator 30 is securely retained to a low level, with the result that a signal which exhibits an unnecessary detection state is not output.

At the time t2, the power supply voltage VDD increases, and the circuits each make a transition to an operation-enabled state.

In the interrupt condition generating circuit 10a, despite a small potential difference between the input signal Vtemp and the power supply voltage VDD, the control signal Scont is settled to a low level because one of the signals is applied with an offset potential. The input signal Vtemp and the reference voltage Vref, which are output from the sensor circuit and the reference power source RF, respectively, gradually increase along with the increase in power supply voltage VDD.

With the control signal Scont being at a low level, the interrupt condition reception circuit 20b and the comparator 30 continue to be in the same state as that of the time t1. Accordingly, the comparator 30 outputs the output signal Vout retained at a low level, with the result that a signal which exhibits an unnecessary detection state is not output.

At the time t3, the input from the reference power source RF represented by the reference voltage Vref reaches a predetermined voltage and then is subjected to constant voltage control, which allows a constant voltage to be input. The power supply voltage VDD and a potential of the input signal Vtemp from the sensor circuit continue to increase.

The reference voltage Vref exhibits a predetermined voltage while the reference voltage Vref exhibits a potential smaller than that of the input signal Vtemp.

Similar to the state from the time t2 described above, in the interrupt condition generating circuit 10a, despite a small potential difference between the input signal Vtemp and the power supply voltage VDD, the control signal Scont is settled to a low level because one of the signals is applied with an offset potential. An output from the sensor circuit, that is, the input signal Vtemp, gradually increases along with the increase in power supply voltage VDD.

With the control signal Scont being at a low level, the interrupt condition reception circuit 20b and the comparator 30 continue to be in the same state as that of the time t1. Accordingly, the output signal Vout of the comparator 30 is securely retained at a low level, with the result that a signal which exhibits an unnecessary detection state is not output.

At the time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops. Then, the power supply voltage VDD has increased to be higher in voltage value than the input signal Vtemp which is determined based on a current supplied by a constant current circuit provided to the sensor circuit and the impedance of the sensor circuit, and a change based on the input signal Vtemp from the sensor circuit may be detected.

At the time t5, the interrupt condition generating circuit 10a detects a predetermined potential difference occurring between the input signal Vtemp from the sensor circuit and the power supply voltage VDD, that is, a potential difference equal to or larger than the offset potential (bias potential Vb) in the interrupt condition generating circuit 10a. The result of the detection indicates that the power supply voltage VDD has made a transition to a state where an operation-enabled power supply voltage may be supplied to the sensor circuit. In the interrupt condition generating circuit 10a, the control signal Scont is set to an interrupt-released state (high level), and the control signal Scont increases in voltage along with the increase in potential of the power supply voltage VDD.

With the control signal Scont being set to the interrupt-released state (high level), the interrupt condition reception circuit 20b switches to output input signals input to the input terminals. The interrupt condition reception circuit 20b outputs, as the signal Sa', the input signal Vtemp input thereto, and outputs, as the signal Sf', the reference voltage Vref input thereto.

At the time t6, the power supply voltage VDD reaches a predetermined operation-enabled power supply voltage and stops increasing further, and hence the power supply voltage VDD starts to exhibit a constant value. Further, the control signal Scont stops increasing in voltage, and makes a transition to a state where a constant value is exhibited.

As described above, each of the signals makes a state transition when power is turned on. No unnecessary detection signal is output as the output signal Vout until the power supply voltage VDD reaches a predetermined operation-enabled power supply voltage, and the output signal Vout is securely retained at a low level, with the result that a signal which exhibits an unnecessary detection state may not be output.

Seventh Embodiment

With reference to the accompanying drawings, another embodiment of the detection circuit which is different in configuration is described.

Figure 15:
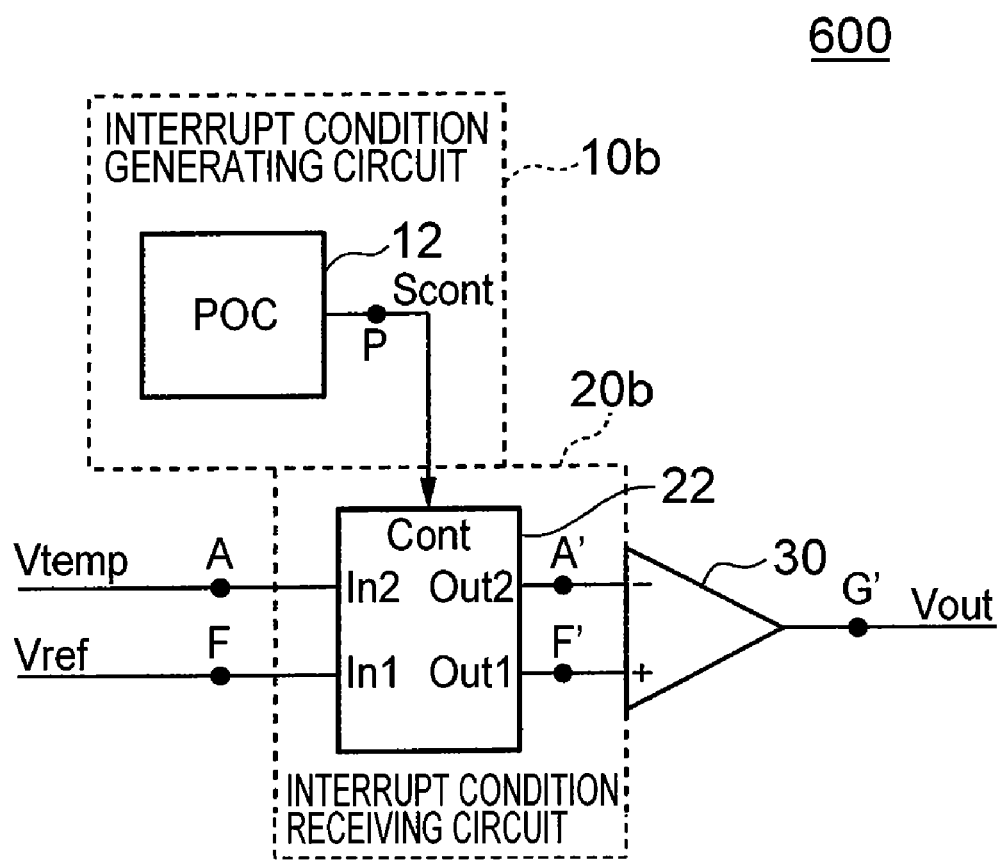
FIG. 15 is a schematic configuration diagram illustrating a detection circuit according to a seventh embodiment of the present invention.

FIG. 15 is a schematic configuration diagram illustrating a detection circuit 600 according to a seventh embodiment of the present invention.

The detection circuit 600 includes the interrupt condition generating circuit 10b, the interrupt condition reception circuit 20b, and the comparator 30. Constituent elements similar to those of FIGS. 1, 3, and 13 are denoted by the same reference numerals and symbols.

Next, a connection state of the detection circuit 600 is described.

The detection circuit 600 receives a power supply for actuating the detection circuit 600, an input of the input signal Vtemp from the sensor circuit (not shown), and an input of the reference voltage Vref output from the reference power source RF (not shown).

The interrupt condition reception circuit 20b has the input terminal In1 connected to the positive terminal of the power source (not shown) which outputs the reference voltage Vref (power supply voltage VDD), the input terminal In2 connected to the output terminal of the sensor circuit (not shown), and the control input terminal Cont connected to an output terminal of the interrupt condition generating circuit 10b. The comparator 30 has the non-inverting input terminal thereof connected to the output terminal Out1 of the interrupt condition reception circuit 20b, and the inverting input terminal thereof connected to the output terminal Out2 of the interrupt condition reception circuit 20b.

Figure 16:
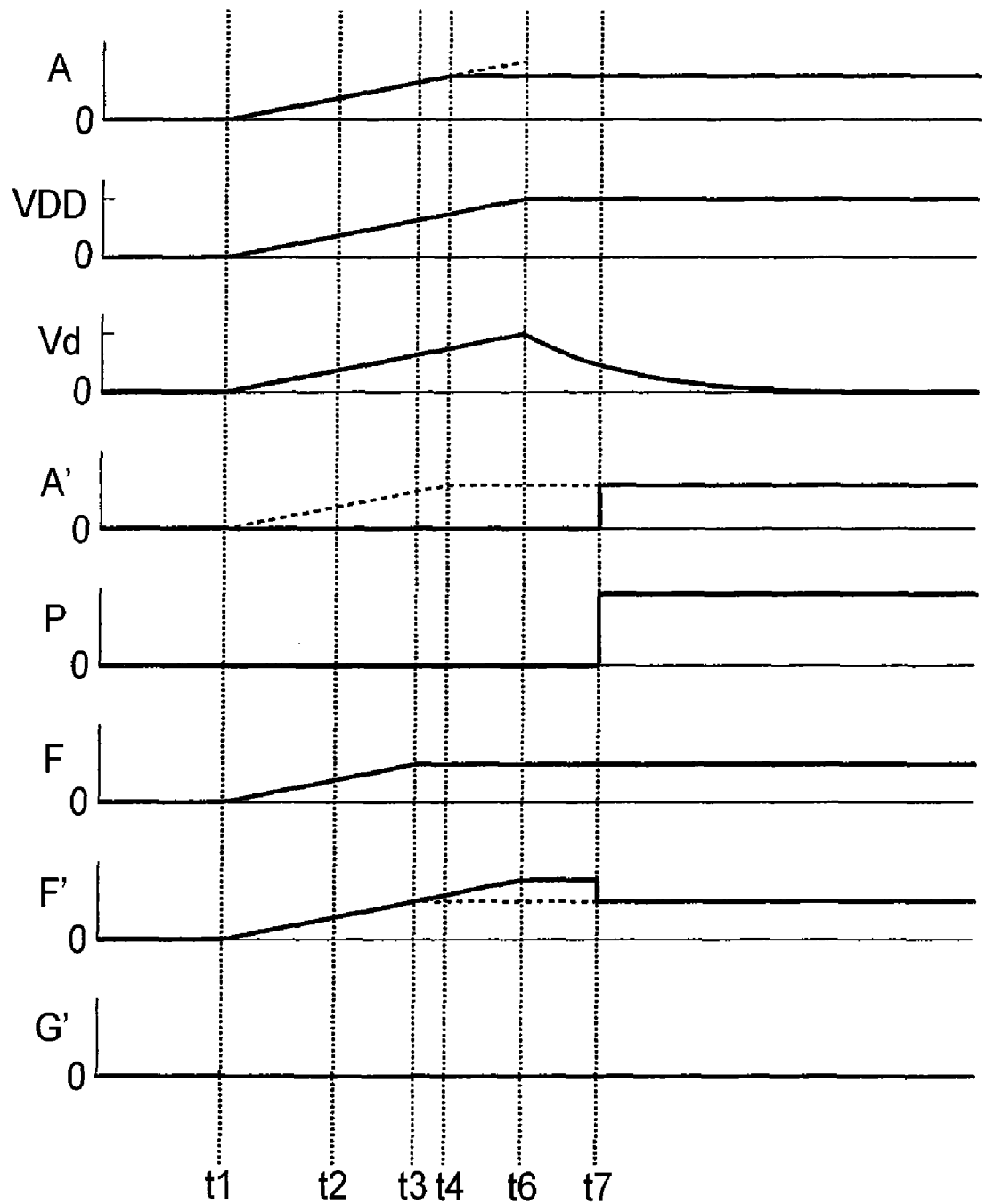
FIG. 16 is a timing chart for illustrating an operation of the detection circuit according to the seventh embodiment.

FIG. 16 is a timing chart for illustrating an operation of the detection circuit 600 according to the seventh embodiment.

With reference to points A, A', F, F', G', Vd, VDD, and P illustrated in the block diagram of FIG. 15, a signal transition at each of those points is described. The signals and times similar to those of FIGS. 2, 4, and 14 are denoted by the same reference symbols, and signals and times different from those of FIGS. 2, 4, and 14 are mainly described. The detection circuit 100 illustrated in FIG. 1, the detection circuit 200 illustrated in FIG. 3, and the detection circuit 500 illustrated in FIG. 13 are interpreted as the detection circuit 600.

In the initial state illustrated in FIG. 16, the power has not been turned on and no electric charge is accumulated in each of the circuits. Hence, the signals each exhibit a non-signal state.

At the time t1, the detection circuit 600, and the sensor circuit and the reference power source RF, which are connected to the detection circuit 600, are powered on. After that, the power supply voltage VDD gradually increases. The input signal Vtemp and the reference voltage Vref output from the sensor circuit and the reference power source RF, respectively, are equal in voltage to the power supply voltage VDD due to the operation of the current source, in a state where the power supply voltage VDD is low. The input signal Vtemp and the reference voltage Vref also gradually increase, along with the increase in power supply voltage VDD, exhibiting change characteristics similar to the power supply voltage VDD.

The POC circuit 12 in the interrupt condition generating circuit 10b detects the power supply voltage VDD.

The capacitor 12c and the resistor 12R form the time constant circuit. Due to the time constant circuit, a potential at the point Vd changes according to a transient characteristic with a first order lag which is identified as a step response based on the power supply voltage VDD as an input. The power supply voltage VDD increases following the power-on, but the control signal Scont still exhibits a low level because the inverter 12a has not been actuated.

On the other hand, the comparator 30, which receives a signal input from the interrupt condition reception circuit 20b, performs a process of settling the output signal Vout so as to exhibit a non-detection state (released state) until the power supply voltage VDD reaches a predetermined voltage. The process of settling the signal so as to exhibit the released state is controlled by the control signal Scont. With the control signal Scont exhibiting a low level, the interrupt condition reception circuit 20b outputs predetermined voltages represented by the signals Sf' and Sa', from the output terminals Out1 and Out2, respectively. The interrupt condition reception circuit 20b outputs, as the signal Sf', the voltage (V−) close to the ground voltage VSS, and outputs, as the signal Sa', the voltage (V+) which increases along with the increase in power supply voltage VDD.

In this manner, the output signal Vout of the comparator 30 is output at a low level, with the result that a signal which exhibits an unnecessary detection state is not output but a signal which exhibits a released state is output.

At the time t2, the power supply voltage VDD increases, and the circuits each make a transition to an operation-enabled state.

In the POC circuit 12 of the interrupt condition generating circuit 10b, a potential at the point Vd is higher than a threshold potential in the inverter 12a. As the power supply voltage VDD to the inverter 12a transiently increases, the threshold potential of the inverter 12a increases along with the increase in power supply voltage VDD. Accordingly, the control signal Scont is settled to a low level. The input signal Vtemp and the reference voltage Vref output from the sensor circuit and the reference power source RF, respectively, also gradually increase along with the increase in power supply voltage VDD.

With the control signal Scont being at a low level, the interrupt condition reception circuit 20b and the comparator 30 continue to be in the same state as that of the time t1. Accordingly, the comparator 30 outputs the output signal Vout retained at a low level, with the result that a signal which exhibits an unnecessary detection state is not output.

At the time t3, the reference voltage Vref input from the reference power source RF reaches a predetermined voltage and then is subjected to constant voltage control, which allows a constant voltage to be input. The power supply voltage VDD and a potential of the input signal Vtemp from the sensor circuit continue to increase.

The reference voltage Vref exhibits a predetermined voltage while the reference voltage Vref exhibits a potential smaller than that of the input signal Vtemp.

Similar to the state from the time t2 described above, in the interrupt condition generating circuit 10b, no state transition occurs, and the control signal Scont is output at a low level. An output from the sensor circuit, that is, the input signal Vtemp, gradually increases along with the increase in power supply voltage VDD.

With the control signal Scont being at a low level, the interrupt condition reception circuit 20b and the comparator 30 continue to be in the same state as that of the time t1. Accordingly, the output signal Vout of the comparator 30 is securely retained at a low level, with the result that a signal which exhibits an unnecessary detection state is not output.

At the time t4, the input signal Vtemp from the sensor circuit makes a transition to a stationary operation state which exhibits a predetermined detection state. As a result, the input signal Vtemp is supposed to change according to a state detected by the sensor circuit, and the continued increase in input signal Vtemp along with the increase in power supply voltage VDD stops.

At the time t6, the power supply voltage VDD reaches a predetermined operation-enabled power supply voltage and stops increasing further, thereby starting to exhibit a constant value. Further, the control signal Scont stops increasing, and makes a transition to a state where a constant value is exhibited. In the POC circuit 12 of the interrupt condition generating circuit 10b, a potential increase at the point Vd stops and the potential starts to decline.

At the time t7, in the POC circuit 12 of the interrupt condition generating circuit 10b, when a potential at the point Vd is reduced to be lower than the threshold voltage of the inverter 12a, the control signal Scont makes a transition to a high level. The interrupt condition generating circuit 10b releases the interrupt state (low level) set to the control signal that has been output as the control signal Scont, and outputs a signal at a high level exhibiting an interrupt-released state.

The comparator 30, which is to receive a signal input from the interrupt condition reception circuit 20b, receives an input of a signal, which has been input to the interrupt condition reception circuit 20b, via the interrupt condition reception circuit 20b. The comparator 30 performs a process of settling the output signal Vout so as to exhibit a released state until the power supply voltage VDD reaches a predetermined voltage. The process of settling the signal so as to exhibit the released state is controlled by the control signal Scont, which is input as a control signal.

With the control signal Scont exhibiting a high level, the interrupt condition reception circuit 20b outputs the signals Sf' and Sa' from the output terminals Out1 and Out2, respectively. The signals correspond to the reference voltage Vref and the input signal Vtemp, respectively.

As a result, the detection circuit 600 makes a transition to a normal state capable of outputting a detection signal.

As described above, each of the signals makes a state transition when power is turned on. The output signal Vout is securely retained at a low level until the power supply voltage VDD reaches a predetermined operation-enabled power supply voltage, with the result that a signal which exhibits an unnecessary detection state may not be output.

Eighth Embodiment

The detection circuit (any one of the detection circuit 100 to the detection circuit 600) illustrated in the first to seventh embodiments may form, when combined with a sensor 900, a desired sensor device 1.

The sensor 900 may be implemented by various sensors, such as a temperature sensor, a magnetic resistant (MR) sensor, and a BGR sensor.

The sensor 900 may be formed by combining a constant current circuit connected to a positive terminal of a power source (power supply voltage VDD) with an impedance circuit which serves as a load in the constant current circuit. The impedance circuit may be selected as a device which changes in impedance according to the scale of a detected event, depending on the intended use of the sensor. With this configuration, even in the operation after power is turned on, an erroneous detection signal due to the power-on may be prevented from being output as the output signal. As a result, a sensor device high in reliability may be formed.

In general, a conventional detection circuit and a conventional sensor device do not have a configuration capable of making the operation-enabled state known outside by its own. In the power supply voltage monitoring circuit provided to the detection circuit and the sensor device described above, the power supply voltage VDD may not be used efficiently, which hinders the minimum operation voltage from being lowered. When the present invention is applied thereto, the above-mentioned problem may also be solved.

According to the present invention, in each of the detection circuits 100, 200, 300, 400, 500, and 600, an input signal is detected before outputting an output signal. In each of the interrupt condition generating circuits 10a, 10b, 10c, and 10d, the power supply voltage VDD supplied thereto is directly detected, and an interrupt signal is output until the power supply voltage VDD makes a transition to a predetermined voltage range. Each of the interrupt condition reception circuits 20a and 20b outputs a predetermined voltage as an output signal without allowing an input signal to be output until the interrupt is released. When the interrupt caused by the interrupt signal is released, the input signal is allowed to be output, and the input signal is output as the output signal.

In this manner, in each of the detection circuits 100, 200, 300, 400, 500, and 600, the interrupt condition generating circuits 10a, 10b, 10c, and 10d each directly detect the power supply voltage VDD. The detection circuits 100, 200, 300, 400, 500, and 600 are capable of detecting the power supply voltage VDD without using a circuit for converting the power supply voltage VDD. With this configuration, power consumption necessary for voltage conversion may be reduced, and a circuit necessary for the conversion may be omitted. Specifically, when each of the detection circuits 100, 200, 300, 400, 500, and 600 outputs an output signal immediately after the power-on, the interrupt signal is canceled after each of the interrupt condition generating circuits 10a, 10b, 10c, and 10d has detected that the power supply voltage VDD has made a transition to a predetermined voltage range. Until the interrupt signal is canceled, the interrupt condition reception circuits 20a and 20b each output a given voltage determined in advance. When the interrupt signal is canceled, an input signal is allowed to be output, and the input signal is output as the output signal. This way secures the reliability of the output signal, because a signal which may exhibit an unsteady state and may be output from the detection circuit immediately after the power-on is prevented from being output.

Further, according to the present invention, in each of the embodiments described above, the interrupt condition generating circuit 10a outputs an interrupt signal when a potential difference in the judgment circuit is lower than an offset potential based on a predetermined potential difference, whereas the interrupt signal is canceled when the potential difference satisfies the offset potential.

This way allows the interrupt condition generating circuit 10a to set a given potential difference determined in advance, as a threshold value, and to detect, based on the threshold value, a potential transition of an input signal, to thereby properly generate an interrupt signal for controlling an output signal.

Further, according to the present invention, in each of the embodiments described above, the interrupt condition generating circuit 10b outputs the interrupt signal until a predetermined time period elapses after power is turned on, and cancels the interrupt signal after a lapse of the predetermined time period.

This way allows the interrupt condition generating circuit 10b to output an interrupt signal which defines an output signal from each of the interrupt condition reception circuits 20a and 20b, until the predetermined time period elapses, to thereby properly generate an interrupt signal for controlling an output signal.

Further, according to the present invention, in each of the embodiments described above, each of the interrupt condition generating circuits 10c and 10d conducts a comparison based on a threshold potential determined in advance, outputs the interrupt signal when the power supply voltage VDD falls short of the threshold potential, and cancels the interrupt signal when the power supply voltage VDD satisfies the threshold potential.

Further, according to the present invention, in each of the embodiments described above, the threshold voltage determined in advance includes a threshold voltage set by each of the transistors Q1 and Q2 which performs switching operation.

This way allows each of the interrupt condition generating circuits 10c and 10d to compare the voltages without the need to design voltage settings using a voltage-dividing circuit or the like. The voltages are compared based on a threshold voltage provided to a semiconductor element. The power supply voltage VDD input to the circuit may be judged, to thereby properly generate an interrupt signal for controlling an output signal.

Further, according to the present invention, in each of the embodiments described above, each of the interrupt condition generating circuits 10c and 10d includes a retaining circuit for retaining a state of the interrupt signal.

With this configuration, an interrupt signal output from each of the interrupt condition generating circuits 10c and 10d is retained in the RS flip-flop 14, which prevents the output signal from being inverted in state under the influence of noise or the like, and the interrupt signal thus input determines the logic for a signal to be output, to thereby ensure the reliability of the output signal.

Further, according to the present invention, in each of the embodiments described above, the interrupt condition generating circuit 10c outputs a reset instruction to reset the RS flip-flop 14 until the predetermined time period elapses after the power is turned on, cancels the reset instruction to reset the RS flip-flop 14 after the lapse of the predetermined time period, and cancels the interrupt signal by setting the RS flip-flop 14 when detecting that the power supply voltage has reached a given voltage determined in advance.

Further, according to the present invention, in each of the embodiments described above, the interrupt condition generating circuit 10d conducts the comparison based on the threshold potential determined in advance, outputs a reset instruction to reset the RS flip-flop 14 when the power supply voltage falls short of the threshold potential, cancels the reset instruction to reset the RS flip-flop 14 when the power supply voltage satisfies the threshold potential, and cancels the interrupt signal by setting the RS flip-flop 14 when detecting that the power supply voltage has reached a given voltage determined in advance.

With this configuration, the result of judgment made on the input signal may be retained, which prevents the output signal from being inverted in state under the influence of noise or the like, and the interrupt signal thus input determines the logic for a signal to be output, to thereby ensure the reliability of the output signal.

Further, according to the present invention, in each of the embodiments described above, the interrupt condition reception circuit 20a outputs a given logic signal in a case where an interrupt state is set, the interrupt state including a state where the given voltage is output as the output signal without allowing the input signal to be output until the interrupt caused by the interrupt signal is released, and selects a logic for a signal to be output according to the input signal in a case where a released state is set, the released state including a state where the interrupt state is released.

With this configuration, the interrupt condition reception circuit 20a determines the logic for a signal to be output, based on the interrupt signal thus input, without depending on an input signal, to thereby ensure the reliability of the signal to be output.

Further, according to the present invention, in each of the embodiments described above, the interrupt condition reception circuit 20b outputs a given potential signal in a case where an interrupt state is set, the interrupt state including a state where the given voltage is output as the output signal without allowing the input signal to be output until the interrupt caused by the interrupt signal is released, and selects a potential for a signal to be output according to the input signal in a case where a released state is set, the released state including a state where the interrupt state is released.

With this configuration, the interrupt condition reception circuit 20b determines the potential for a signal to be output, based on the interrupt signal thus input, without depending on an input signal, to thereby ensure the reliability of the signal to be output.

Further, according to the present invention, in each of the embodiments described above, the comparator 30 detects an input signal input thereto. The interrupt condition reception circuit 20a receives the output signal Sg input from the comparator 30, and generates the output signal Vout to be output, based on the interrupt signal input from each of the interrupt condition generating circuits 10a, 10b, 10c, and 10d.

With this configuration, an input signal from the sensor circuit is subjected to a judgment process in the comparator 30. An erroneous detection signal contained in a signal output from the comparator 30 when power is turned on is intercepted by the interrupt condition reception circuit 20a so as not to be output as the detection signal.

Further, according to the present invention, in each of the embodiments described above, the comparator 30 detects an input signal input thereto. The interrupt condition reception circuit 20b generates the signal Sa' and the signal Sf' to be output, according to the interrupt signal (control signal Scont) input from each of the interrupt condition generating circuits 10a and 10b, and inputs the output signal to the comparator 30.

With this configuration, even if an erroneous detection signal is generated when power is turned on, the interrupt condition reception circuit 20a intercepts an input signal from the sensor circuit, with the result that a signal output from the comparator 30 connected in the subsequent stage may not contain the erroneous detection signal.

Further, according to the present invention, in the sensor device 1, each of the detection circuits 100, 200, 300, 400, 500, and 600 according to any one of the embodiments described above outputs information corresponding to physical quantities detected by the sensor 900, and detects the information on the physical quantity.

With this configuration, a signal output from the sensor device 1 is prevented from falling in an undefined state during a period in which power is turned on, to thereby ensure the reliability of the output signal. Further, the sensor device 1 is formed using the detection circuit according to any one of the embodiments of the present invention, to thereby attain low power consumption. The sensor circuit is formed by including the detection circuit capable of detecting a power supply voltage directly, to thereby ensure the quality of detection while downscaling the detection circuit.

Further, according to the present invention, in the embodiments described above, the sensor 900 includes a temperature sensor for detecting temperatures.

Accordingly, the sensor device 1 may be formed as a temperature sensor for detecting temperatures, and a signal output from the sensor device 1 is prevented from falling in an undefined state during a period in which power is turned on, to thereby ensure the reliability of the output signal. Further, the sensor device 1 is formed using the detection circuit according to any one of the embodiments of the present invention, to thereby attain low power consumption. The sensor circuit is formed by including the detection circuit capable of detecting a power supply voltage directly, to thereby ensure the quality of detection while downscaling the detection circuit.

It should be noted that the present invention may not be limited to the embodiments described above, and may be subjected to various modifications without departing from the gist of the present invention. The connection state of the comparator 30 or the offset comparator 11 provided to the detection circuits 100, 200, 300, 400, 500, and 600, and voltage settings for a signal to be input may be varied, to thereby reverse the polarity of the output signal.

It should be noted that the detection circuits 100, 200, 300, 400, 500, and 600 each correspond to the detection circuit of the present invention. Further, the interrupt condition generating circuits 10a and 10b each correspond to the interrupt condition generating circuit of the present invention. Still further, the interrupt condition reception circuits 20a and 20b each correspond to the interrupt condition reception circuit of the present invention. Still further, the offset comparator 11 corresponds to the judgment circuit of the present invention. Still further, the RS flip-flop 14 corresponds to the retaining circuit of the present invention. Still further, the sensor device 1 corresponds to the sensor device of the present invention. Still further, the sensor 900 corresponds to the detection section of the present invention.

What is claimed is:

1. A detection circuit for detecting an input signal input thereto to output an output signal, comprising:
   an interrupt condition generating circuit for directly detecting a power supply voltage supplied thereto, and outputting an interrupt signal until the power supply voltage makes a transition to a predetermined voltage range; and
   an interrupt condition reception circuit for outputting, as an output signal, a given voltage without allowing the input signal to be output until an interrupt caused by the interrupt signal is released, and outputting, as an output signal, the input signal by allowing the input signal to be output when the interrupt caused by the interrupt signal is released.

2. A detection circuit according to claim 1, wherein the interrupt condition generating circuit comprises a judgment circuit for setting an offset potential to one of two signals input thereto, the offset potential being determined based on a potential difference determined in advance, outputting the interrupt signal when a potential difference between the two input signals falls short of the offset potential, and canceling the interrupt signal when the potential difference satisfies the offset potential.

3. A detection circuit according to claim 1, wherein the interrupt condition generating circuit outputs the interrupt signal until a predetermined time period elapses after power is turned on, and cancels the interrupt signal after a lapse of the predetermined time period.

4. A detection circuit according to claim 1, wherein the interrupt condition generating circuit conducts a comparison based on a threshold potential determined in advance, outputs the interrupt signal when the power supply voltage falls short of the threshold potential, and cancels the interrupt signal when the power supply voltage satisfies the threshold potential.

5. A detection circuit according to claim 4, wherein the threshold voltage determined in advance includes a threshold voltage set by a semiconductor element which performs a switching operation.

6. A detection circuit according to claim 1, wherein the interrupt condition generating circuit comprises a retaining circuit for retaining a state of the interrupt signal.

7. A detection circuit according to claim 6, wherein the interrupt condition generating circuit outputs a reset instruction to reset the retaining circuit until a predetermined time period elapses after the power is turned on, cancels the reset instruction after a lapse of the predetermined time period, and cancels the interrupt signal by setting the retaining circuit when detecting that the power supply voltage has reached a given voltage determined in advance.

8. A detection circuit according to claim 6, wherein the interrupt condition generating circuit conducts the comparison based on a threshold potential determined in advance, outputs a reset instruction to reset the retaining circuit when the power supply voltage falls short of the threshold potential, cancels the reset instruction when the power supply voltage satisfies the threshold potential, and cancels the interrupt signal by setting the retaining circuit when detecting that the power supply voltage has reached a given voltage determined in advance.

9. A detection circuit according to claim 1, wherein the interrupt condition reception circuit outputs a given logic signal in a case where an interrupt state is set, the interrupt state including a state where the given voltage is output as the output signal without allowing the input signal to be output until the interrupt caused by the interrupt signal is released, and selects a logic for a signal to be output according to the input signal in a case where a released state is set, the released state including a state where the interrupt state is released.

10. A detection circuit according to claim 1, wherein the interrupt condition reception circuit outputs a given potential signal in a case where an interrupt state is set, the interrupt state including a state where the given voltage is output as the output signal without allowing the input signal to be output until the interrupt caused by the interrupt signal is released, and selects a potential for a signal to be output according to the input signal in a case where a released state is set, the released state including a state where the interrupt state is released.

11. A detection circuit according to claim 1, further comprising a comparator for detecting the input signal,
wherein the interrupt condition reception circuit inputs an output signal from the comparator, and generates, according to the interrupt signal, an output signal to be output.

12. A detection circuit according to claim 1, further comprising a comparator for detecting the input signal,
wherein the interrupt condition reception circuit generates, according to the interrupt signal, an output signal to be output, and inputs the output signal to the comparator.

13. A sensor device, comprising:
the detection circuit according to claim 1; and
a detection section for outputting information corresponding to detected physical quantities.

14. A sensor device according to claim 13, wherein the detection section comprises a temperature sensor for detecting temperatures.

* * * * *